(12) United States Patent
Kayahara

(10) Patent No.: US 7,715,029 B2
(45) Date of Patent: May 11, 2010

(54) PRINTING SUPPORT SYSTEM FOR REDUCING ENVIRONMENTAL LOAD, PRINTING SUPPORT PROGRAM FOR REDUCING ENVIRONMENTAL LOAD, AND PRINTING SUPPORT METHOD FOR REDUCING ENVIRONMENTAL LOAD

(75) Inventor: Naoki Kayahara, Chino (JP)

(73) Assignee: Seiko Epson Corporation (JP)

( * ) Notice: Subject to any disclaimer, the term of this patent is extended or adjusted under 35 U.S.C. 154(b) by 1035 days.

(21) Appl. No.: 11/382,791

(22) Filed: May 11, 2006

(65) Prior Publication Data

US 2006/0256363 A1 Nov. 16, 2006

(30) Foreign Application Priority Data

| May 12, 2005 | (JP) | ............................ 2005-139316 |
| May 31, 2005 | (JP) | ............................ 2005-159288 |
| Jun. 2, 2005 | (JP) | ............................ 2005-162479 |
| Mar. 10, 2006 | (JP) | ............................ 2006-066586 |

(51) Int. Cl.
*G06F 3/12* (2006.01)

(52) U.S. Cl. ................... 358/1.13; 358/1.14; 358/1.15; 358/1.16; 358/1.2

(58) Field of Classification Search ....... 358/1.13–1.16, 358/1.2; 100/164, 271, 280, 281
See application file for complete search history.

(56) References Cited

U.S. PATENT DOCUMENTS 5,365,360 A * 11/1994 Torres ........................ 715/802

(Continued)

FOREIGN PATENT DOCUMENTS

JP 01-235655 9/1989

(Continued)

*Primary Examiner*—Benny Q Tieu
*Assistant Examiner*—Quyen Ngo
(74) *Attorney, Agent, or Firm*—Harness, Dickey & Pierce, P.L.C.

(57) ABSTRACT

A printing support system for reducing an environmental load that changes an input load of a print operation depending on data representing the environmental load includes: an environmental load calculation basis information storage unit that stores environmental load calculation basis information used to calculate the data representing the environmental load; a print request input unit through which a print request including a print setting is input; an environmental load calculation unit that calculates the data representing the environmental load on the basis of the print request input by the print request input unit and the environmental load calculation basis information stored in the environmental load calculation basis information storage unit; a print operation input unit through which a print operation for instructing to start printing is input; and a determination unit that, when it is determined that the print operation through the print operation input unit has been input more than a predetermined condition on the basis of the data representing the environmental load calculated by the environmental load calculation unit, allows printing according to the print request input by the print request input unit.

26 Claims, 16 Drawing Sheets

U.S. PATENT DOCUMENTS

| | | | |
|---|---|---|---|
| 6,064,838 A * | 5/2000 | Maruta et al. | 399/79 |
| 6,283,571 B1 | 9/2001 | Zhou et al. | |
| 6,293,643 B1 | 9/2001 | Shimada et al. | |
| 6,328,404 B1 | 12/2001 | Fujimori | |
| 6,614,546 B1 * | 9/2003 | Kurozasa | 358/1.15 |
| 6,655,946 B2 * | 12/2003 | Foreman et al. | 425/145 |
| 6,980,312 B1 * | 12/2005 | Czyszczewski et al. | 358/1.15 |
| 2005/0024669 A1 * | 2/2005 | Aoki | 358/1.13 |

FOREIGN PATENT DOCUMENTS

| | | |
|---|---|---|
| JP | 06-227006 | 8/1994 |
| JP | 11-151821 | 8/1999 |
| JP | 11-254662 | 9/1999 |
| JP | 2000-79710 | 3/2000 |
| JP | 2000-190470 | 7/2000 |
| JP | 2000-225716 | 8/2000 |
| JP | 2004-330639 | 11/2004 |

* cited by examiner

| COLOR | COST (UNIT: YEN / DOT) |
|---|---|
| . | |
| . | |
| BLACK (K) | 0. 000001 |
| CYAN (C) | 0. 000003 |
| MAGENTA (M) | 0. 000003 |
| YELLOW (Y) | 0. 000003 |
| . | |

| PAPER SIZE | COST (UNIT: YEN / PAPER) |
|---|---|
| . | |
| . | |
| A3 | 10 |
| A4 | 5 |
| A5 | 3 |
| . | |
| . | |

FIG. 4

| PRINT MODE | COST (UNIT: YEN / PRINTING) |
|---|---|
| . | |
| A3 COLOR | 1 |
| A3 BLACK | 0.3 |
| A4 COLOR | 0.5 |
| A4 BLACK | 0.1 |
| . | |
| . | |

FIG. 5

PRINT

PRINTER
- PRINTER NAME (N): XXXXX LP-9600S ▼
- STATE: IDLE
- TYPE: XXXXX LP-9600S
- LOCATION: IP_xxx.xxx.xxx.xxx : PASSTHRU
- COMMENT:

☐ OUTPUT TO FILE (L)     [ PROPERTY (P) ]

PRINT RANGE
- ⦿ ALL (A)
- ○ CURRENT PAGE (E)
- ○ PAGE DESIGNATION (G): [         ]

DESIGNATE PAGE NUMBER BY SEPARATING PAGE NUMBER WITH COMMA LIKE 1, 3, 6 OR DESIGNATE PAGE RANGE LIKE 4 - 8

THE NUMBER OF COPIES TO BE PRINTED
- THE NUMBER OF COPIES (C): [ 1 ] ▲▼
- ☑ PRINT BY UNIT OF THE NUMBER OF COPIES (T)

ENLARGEMENT / REDUCTION
- THE NUMBER OF PAGES PER PAPER (H): 1 PAGE ▼
- PAPER SIZE DESIGNATION (Z): NO DESIGNATION ▼

- OBJECT TO BE PRINTED (W): DOCUMENT ▼
- PRINT DESIGNATION (R): ALL PAGES ▼

[ OPTION (O) ]     [ OK ]  [ CANCEL ]

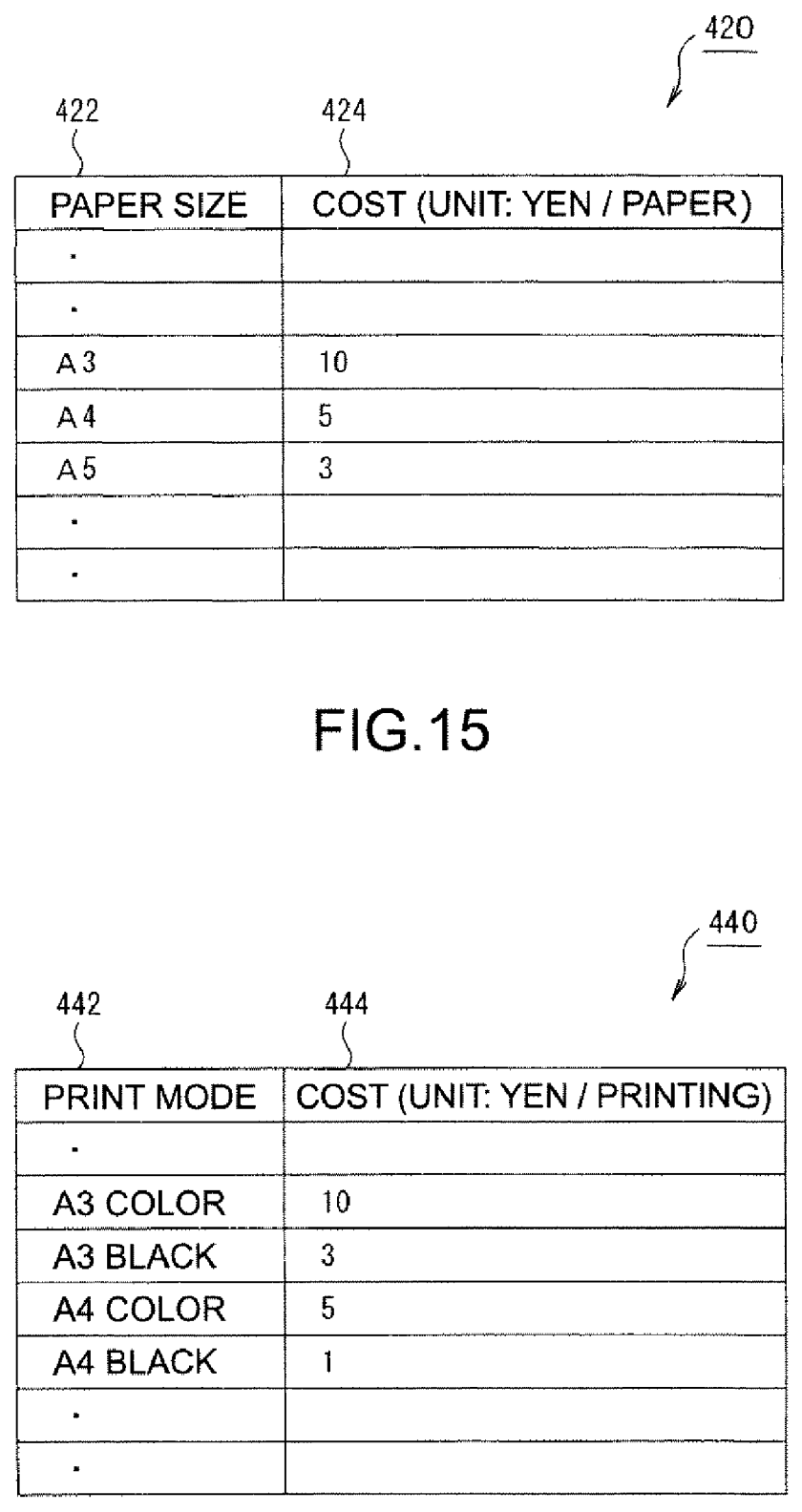

| PAPER SIZE | COST (UNIT: YEN / PAPER) |
|---|---|
| . | |
| . | |
| A 3 | 10 |
| A 4 | 5 |
| A 5 | 3 |
| . | |
| . | |

| PRINT MODE | COST (UNIT: YEN / PRINTING) |
|---|---|
| . | |
| A3 COLOR | 10 |
| A3 BLACK | 3 |
| A4 COLOR | 5 |
| A4 BLACK | 1 |
| . | |
| . | |

FIG.16

PRINTING SUPPORT SYSTEM FOR REDUCING ENVIRONMENTAL LOAD, PRINTING SUPPORT PROGRAM FOR REDUCING ENVIRONMENTAL LOAD, AND PRINTING SUPPORT METHOD FOR REDUCING ENVIRONMENTAL LOAD

BACKGROUND

1. Technical Field

The present invention related to a printing support system, a printing support program, and a printing support method. In particular, the invention relates to a printing support system for reducing an environmental load, a printing support program for reducing an environmental load, and a printing support method for reducing an environmental load, which can reduce the occurrence of misprint by demanding a user to confirm a print setting state and thus can reduce the environmental load.

2. Related Art

In conventional printing technologies, there has been a problem in that paper or ink is wasted due to misprint caused by a document data creation error or a print setting error. A system for solving the problem includes a printing system disclosed in JP-A-2004-330639 and an image forming system disclosed in JP-A-6-227006.

The printing system disclosed in JP-A-2004-330639 includes a print request input unit through which a print request according to a predetermined printing condition is input, an acquiring unit that acquires the number of printed sheets of printing paper, a memory unit that stores environment resource consumption information in respect to an amount of environment resources consumed by using a predetermined number of sheets of printing paper, a consumed resource amount calculation unit that calculates information in respect to the amount of environment resources consumed when the printing paper in which the number of sheets corresponds to the requested number of sheets to be printed has been used, an image forming unit that forms an image indicating the amount of consumed resources, and a display control unit that displays the image.

Further, in the image forming system disclosed in JP-A-6-227006, paying attention to a characteristic of a textile printing apparatus in which a basic pattern is repeated, the number of printing dots on each ink color is calculated on the basis of print data by which the basic pattern is formed. In addition, on the basis of the print data, the amount of consumption or the cost of expendable supplies, such as a head or ink, is calculated.

A default print setting may be made through a printer driver. Accordingly, by setting multi-pages on a sheet of paper or double-sided printing as a default, it is possible to save printing paper and ink.

However, in many cases, a user that routinely performs a print operation does not sufficiently check what the default print setting state is and performs a print operation by clicking a print start button on a print dialog screen of a printer driver through consecutive input operations, such as consecutive clicking operations. For this reason, in the case in which a user intends to perform single-sided printing even though double-sided printing is set as a default, the double-sided printing process is performed due to the user's negligent and consecutive clicking operations, which results in misprint. In this case, paper, ink, or the like is wasted, which consequently affects the environmental resources.

Further, in the printing system disclosed in JP-A-2004-330639, even though the image that indicates the amount of resources consumed when the printing paper of which the number of sheets corresponds to the requested number of sheets to be printed has been used can be displayed, there is the same problem as described above for a user that performs the consecutive input operations, such as consecutive clicking operations.

Furthermore, in the image forming system disclosed in JP-A-6-227006, even though the amount of consumption or the cost of expendable supplies can be calculated, there also occurs the same problem as described above only with the calculation on the amount of consumption or the cost of expendable supplies.

SUMMARY

An advantage of some aspects of the invention is that it provides a printing support system for reducing an environmental load, a printing support program for reducing an environmental load, and a printing support method for reducing an environmental load, which can reduce the occurrence of misprint by demanding a user to confirm a print setting state and thus can reduce the environmental load.

According to a first aspect of the invention, a printing support system for reducing an environmental load that changes an input load of a print operation depending on data representing the environmental load includes: an environmental load calculation basis information storage unit that stores environmental load calculation basis information used to calculate the data representing the environmental load; a print request input unit through which a print request including a print setting is input; an environmental load calculation unit that calculates the data representing the environmental load on the basis of the print request input by the print request input unit and the environmental load calculation basis information stored in the environmental load calculation basis information storage unit; a print operation input unit through which a print operation for instructing to start printing is input; and a determination unit that, when it is determined that the print operation through the print operation input unit has been input consecutively and continuously for more than a predetermined period of time on the basis of the data representing the environmental load calculated by the environmental load calculation unit, allows printing according to the print request input by the print request input unit.

In this configuration, if the print request is input by the print request input unit, the data representing the environmental load is calculated by the environmental load calculation unit on the basis of the input print request and the environmental load calculation basis information stored in the environmental load calculation basis information storage unit.

In order to start printing, even if a user inputs, through the print operation input unit, the print operation for instructing to start the printing, the print operation is not effective until it is determined that the print operation has been input continuously for more than the predetermined period of time on the basis of the calculated data representing the environmental load.

That is, as a response to the print request in which the data representing the environmental load (waste of printing paper, ink, or the like) is large, in the case when a whole printed matter is definitely needed, the print operation should be input continuously for a long period of time so as to confirm the printing.

Here, the 'print operation for instructing to start printing' means a user's action, such as pressing an 'OK' button on a screen of a printer driver or pressing a 'start' button of a copying machine. Accordingly, the 'print operation input unit' through which the print operation is input means a user interface (U/I), such as the 'OK' button or the 'start' button. In addition, the 'input consecutively and continuously' means that a button is pressed consecutively and continuously, for example.

As a result that the user has input the print operation consecutively and continuously, if it is determined that the print operation has been input consecutively and continuously for more than the predetermined period of time, the determination unit allows printing corresponding to the input print request. For example, by counting the time when a button is pressed, it is determined whether or not the button has been pressed consecutively and continuously for more than the predetermined period of time.

Thus, as a response to the print request in which data representing the environmental load (waste of printing paper, ink, or the like) is large, in the case when a whole printed matter is definitely needed, the printing process does not start if the print operation is not input continuously for a long period of time. Accordingly, it is possible to demand a user to confirm the print setting state. As a result, since it can be expected that the misprint will be reduced, it is possible to reduce the environmental load as compared with a case in the related art.

Here, the environmental load means the influence of the printing with respect to the environment. For example, the environmental load can be calculated as a cost required for the printing. This is because, as the number of sheets of paper increases, both the environmental load and the printing cost (paper cost, ink cost) in the case when the printing fails increase together. This is the same as in a printing support system for reducing an environmental load according to a fourth aspect of the invention, a printing support program for reducing an environmental load according to a seventh or tenth aspect of the invention, and a printing support method for reducing an environmental load according to a thirteenth or sixteenth aspect of the invention, which will be described below.

In addition, as the print setting, at least one of whether or not multi-pages on a sheet of paper are to be applied, the number of multi-pages on a sheet of paper, whether or not double-sided printing is to be applied, the number of copies to be printed, and other print settings is included. This is the same as in the printing support system for reducing the environmental load according to the fourth aspect of the invention, the printing support program for reducing the environmental load according to one of the seventh and tenth aspects of the invention, and the printing support method for reducing the environmental load according to one of the thirteenth and sixteenth aspects of the invention, which will be described below.

In addition, specifically, even though the print request is related to a user's action, such as pressing an 'OK' button on a screen of a printer driver, the print request is event information that 'button has been pressed' in the print request input unit.

In addition, the environmental load calculation basis information storage unit stores the environmental load calculation basis information at every time. That is, the environmental load calculation basis information storage unit may store the environmental load calculation basis information beforehand or may store the environmental load calculation basis information by, for example, an external input at the time of an operation of the system. This is the same as in the printing support system for reducing the environmental load according to the fourth aspect of the invention.

In addition, the system may be implemented by means of a single device, a terminal, or other apparatuses, or may be implemented by means of a network system in which a plurality of devices, terminals, and other apparatuses are communicatably connected to one another. In the latter case, each of the components may be included in any one of the plurality of devices as long as the components are communicatably connected to one another. This is the same as in the printing support system for reducing the environmental load according to the fourth aspect of the invention.

Further, according to a second aspect of the invention, in the printing support system for reducing the environmental load according to the first aspect of the invention, preferably, when the data representing the environmental load is equal to or larger than a predetermined value, the determination unit allows the printing according to the print request if it is determined that the print operation has been input consecutively and continuously for more than the predetermined period of time.

In this configuration, when the data representing the environmental load is equal to or larger than a predetermined value, the determination unit allows the printing according to the print request if it is determined that the print operation has been input consecutively and continuously for more than the predetermined period of time.

Thus, it is possible to obtain the effects in which the predetermined input load can be generated when the data representing the environmental load is equal to or larger than the predetermined value.

Furthermore, according to a third aspect of the invention, in the printing support system for reducing the environmental load according to the first aspect of the invention, preferably, the determination unit allows the printing according to the print request when it is determined that the print operation has been input consecutively and continuously more than a period of time corresponding to the data representing the environmental load.

In this configuration, when it is determined that the print operation has been input consecutively and continuously more than the period of time corresponding to the data representing the environmental load, the determination unit allows the printing according to the print request.

Thus, it is possible to obtain the effects in which the predetermined input load corresponding to the data representing the environmental load can be generated.

Further, according to a fourth aspect of the invention, a printing support system for reducing an environmental load that changes an input load of a print operation depending on data representing the environmental load includes: an environmental load calculation basis information storage unit that stores environmental load calculation basis information used to calculate the data representing the environmental load; a print request input unit through which a print request including a print setting is input; an environmental load calculation unit that calculates the data representing the environmental load on the basis of the print request input by the print request input unit and the environmental load calculation basis information stored in the environmental load calculation basis information storage unit; a print operation input unit through which a print operation for instructing to start printing is input; and a determination unit that, when it is determined that the print operation through the print operation input unit has been input more than the predetermined number of times on the basis of the data representing the environmental load calculated by the environmental load calculation unit, allows printing according to the print request input by the print request input unit.

In this configuration, if the print request is input by the print request input unit, the data representing the environmental load is calculated by the environmental load calculation unit on the basis of the input print request and the environmental load calculation basis information stored in the environmental load calculation basis information storage unit.

In order to start printing, even if a user inputs, through the print operation input unit, the print operation for instructing to start the printing, the print operation is not effective until it is determined that the print operation has been input more than the predetermined number of times on the basis of the calculated data representing the environmental load. That is, in the case when the printing according to the print request fails, as the data representing the environmental load becomes larger, more print operations should be input.

As a result that the user has repeatedly input the print operation, if it is determined that the print operation has been input more than the predetermined number of times, the determination unit allows printing corresponding to the input print request.

Thus, in the case when data representing the environmental load due to the misprint is large, the printing process does not start if the print operation is not input a plurality of times. Accordingly, it is possible to demand a user to confirm the print setting state. As a result, since it can be expected that the misprint will be reduced, it is possible to reduce the environmental load as compared with a case in the related art.

Furthermore, according to a fifth aspect of the invention, in the printing support system for reducing the environmental load according to the fourth aspect of the invention, preferably, when the data representing the environmental load is equal to or larger than a predetermined value, the determination unit allows the printing according to the print request if it is determined that the print operation has been input more than the predetermined number of times.

In this configuration, when the data representing the environmental load is equal to or larger than the predetermined value, the determination unit allows the printing according to the print request if it is determined that the print operation has been input more than the predetermined number of times.

Thus, it is possible to obtain the effects in which the predetermined input load can be generated when the data representing the environmental load is equal to or larger than the predetermined value.

Furthermore, according to a sixth aspect of the invention, in the printing support system for reducing the environmental load according to the fourth aspect of the invention, preferably, the determination unit allows the printing according to the print request when it is determined that the print operation has been input more than the number of times corresponding to the data representing the environmental load.

In this configuration, if it is determined that the print operation has been input more than the number of times corresponding to the data representing the environmental load, the determination unit allows the printing according to the print request.

Thus, it is possible to obtain the effects in which the input load corresponding to the data representing the environmental load can be generated.

In addition, according to a seventh aspect of the invention, a printing support program for reducing an environmental load that changes an input load of a print operation depending on data representing the environmental load includes a program causing a computer to execute: inputting a print request including a print setting; calculating the environmental load by calculating the data representing the environmental load on the basis of the print request made in the inputting of the print request and environmental load calculation basis information stored in an environmental load calculation basis information storage unit used to calculate the data representing the environmental load; inputting a print operation for instructing to start printing; and determining that printing according to the print request made in the inputting of the print request is allowed, when it is determined that the print operation performed in the inputting of the print operation has been input consecutively and continuously for more than a predetermined period of time on the basis of the data representing the environmental load obtained in the calculating of the environmental load.

In this configuration, since the computer reads out the program and then performs the processes according to the read program, it is possible to obtain the same operations and effects as in the printing support system for reducing the environmental load according to the first aspect of the invention.

Further, according to an eighth aspect of the invention, in the printing support program for reducing the environmental load according to the seventh aspect of the invention, preferably, in the determining, when the data representing the environmental load is equal to or larger than a predetermined value, the printing according to the print request is allowed if it is determined that the print operation has been input consecutively and continuously for more than the predetermined period of time.

In this configuration, since the computer reads out the program and then performs the processes according to the read program, it is possible to obtain the same operations and effects as in the printing support system for reducing the environmental load according to the second aspect of the invention.

Furthermore, according to a ninth aspect of the invention, in the printing support program for reducing the environmental load according to the seventh aspect of the invention, preferably, in the determining, the printing according to the print request is allowed when it is determined that the print operation has been input consecutively and continuously more than a period of time corresponding to the data representing the environmental load.

In this configuration, since the computer reads out the program and then performs the processes according to the read program, it is possible to obtain the same operations and effects as in the printing support system for reducing the environmental load according to the third aspect of the invention.

In addition, according to a tenth aspect of the invention, a printing support program for reducing an environmental load that changes an input load of a print operation depending on data representing the environmental load includes a program causing a computer to execute: inputting a print request including a print setting; calculating the environmental load by calculating the data representing the environmental load on the basis of the print request made in the inputting of the print request and environmental load calculation basis information stored in an environmental load calculation basis information storage unit used to calculate the data representing the environmental load; inputting a print operation for instructing to start printing; and determining that printing according to the print request made in the inputting of the print request is allowed, when it is determined that the print operation performed in the inputting of the print operation has been input more than the predetermined number of times on the basis of the data representing the environmental load obtained in the calculating of the environmental load.

In this configuration, since the computer reads out the program and then performs the processes according to the read program, it is possible to obtain the same operations and effects as in the printing support system for reducing the environmental load according to the fourth aspect of the invention.

Furthermore, according to an eleventh aspect of the invention, in the printing support program for reducing the environmental load according to the tenth aspect of the invention, preferably, in the determining, when the data representing the environmental load is equal to or larger than a predetermined value, the printing according to the print request is allowed when it is determined that the print operation has been input more than the predetermined number of times.

In this configuration, since the computer reads out the program and then performs the processes according to the read program, it is possible to obtain the same operations and effects as in the printing support system for reducing the environmental load according to the fifth aspect of the invention.

Furthermore, according to a twelfth aspect of the invention, in the printing support program for reducing the environmental load according to the tenth aspect of the invention, preferably, in the determining, the printing according to the print request is allowed when it is determined that the print operation has been input more than the predetermined number of times corresponding to the data representing the environmental load.

In this configuration, since the computer reads out the program and then performs the processes according to the read program, it is possible to obtain the same operations and effects as in the printing support system for reducing the environmental load according to the sixth aspect of the invention.

Further, according to a thirteenth aspect of the invention, a printing support method for reducing an environmental load that changes an input load of a print operation depending on data representing the environmental load includes: inputting a print request including a print setting; calculating the environmental load by calculating the data representing the environmental load on the basis of the print request made in the inputting of the print request and environmental load calculation basis information stored in an environmental load calculation basis information storage unit used to calculate the data representing the environmental load; inputting a print operation for instructing to start printing; and determining that printing according to the print request made in the inputting of the print request is allowed, when it is determined that the print operation performed in the inputting of the print operation has been input consecutively and continuously for more than a predetermined period of time on the basis of the data representing the environmental load obtained in the calculating of the environmental load.

Thus, the same effects as in the printing support system for reducing the environmental load according to the first aspect of the invention can be obtained.

Further, according to a fourteenth aspect of the invention, in the printing support method for reducing the environmental load according to the thirteenth aspect of the invention, preferably, in the determining, when the data representing the environmental load is equal to or larger than a predetermined value, the printing according to the print request is allowed if it is determined that the print operation has been input consecutively and continuously for more than the predetermined period of time.

Thus, the same effects as in the printing support system for reducing the environmental load according to the second aspect of the invention can be obtained.

Furthermore, according to a fifteenth aspect of the invention, in the printing support method for reducing the environmental load according to the thirteenth aspect of the invention, preferably, in the determining, the printing according to the print request is allowed when it is determined that the print operation has been input consecutively and continuously more than a period of time corresponding to the data representing the environmental load.

Thus, the same effects as in the printing support system for reducing the environmental load according to the third aspect of the invention can be obtained.

In addition, according to a sixteenth aspect of the invention, a printing support method for reducing an environmental load that changes an input load of a print operation depending on data representing the environmental load includes: inputting a print request including a print setting; calculating the environmental load by calculating the data representing the environmental load on the basis of the print request made in the inputting of the print request and environmental load calculation basis information stored in an environmental load calculation basis information storage unit used to calculate the data representing the environmental load; inputting a print operation for instructing to start printing; and determining that printing according to the print request made in the inputting of the print request is allowed, when it is determined that the print operation performed in the inputting of the print operation has been input more than the predetermined number of times on the basis of the data representing the environmental load obtained in the calculating of the environmental load.

Thus, the same effects as in the printing support system for reducing the environmental load according to the fourth aspect of the invention can be obtained.

Furthermore, according to a seventeenth aspect of the invention, in the printing support method for reducing the environmental load according to the sixteenth aspect of the invention, preferably, in the determining, when the data representing the environmental load is equal to or larger than a predetermined value, the printing according to the print request is allowed when it is determined that the print operation has been input more than the predetermined number of times.

Thus, the same effects as in the printing support system for reducing the environmental load according to the fifth aspect of the invention can be obtained.

Furthermore, according to an eighteenth aspect of the invention, in the printing support method for reducing the environmental load according to the sixteenth aspect of the invention, preferably, in the determining, the printing according to the print request is allowed when it is determined that the print operation has been input more than the predetermined number of times corresponding to the data representing the environmental load.

Thus, the same effects as in the printing support system for reducing the environmental load according to the sixth aspect of the invention can be obtained.

Further, according to a nineteenth aspect of the invention, a printing support system for reducing an environmental load that changes an input load of a print operation depending on data representing the environmental load includes: an environmental load calculation basis information storage unit that stores environmental load calculation basis information used to calculate the data representing the environmental load; a print setting input unit through which a print setting is input;

an environmental load calculation unit that calculates the data representing the environmental load on the basis of the print setting input by the print setting input unit and the environmental load calculation basis information stored in the environmental load calculation basis information storage unit; a print operation input unit through which a print operation for instructing to start printing is input; a compression force adjustment unit that adjusts a compression force at the time of input to the print operation input unit; a compression force control unit that controls the compression force adjustment unit on the basis of the data representing the environmental load calculated by the environmental load calculation unit; and a determination unit that allows printing when it is determined that the print operation has been input through the print operation input unit.

In this configuration, if the print setting is input by the print setting input unit, the data representing the environmental load is calculated by the environmental load calculation unit on the basis of the input print setting and the environmental load calculation basis information stored in the environmental load calculation basis information storage unit. In addition, the compression force adjustment unit controlled by the compression force control unit on the basis of the calculated environmental load. As a result, by means of the compression force adjustment unit, the compression force corresponding to the input to the print operation input unit is generated. In addition, the color change may be easily performed as well as changing the compression force of a button.

In order to start printing, even if a user inputs, through the print operation input unit, the print operation for instructing to start the printing, the print operation is not effective until the user inputs the print operation with a force stronger than a force generated by the compression force adjustment unit. That is, in the case when printing fails, if the data representing the environmental load (waste of printing paper, ink, or the like) is large, the user should input the print operation with a strong force.

As a result that the user has input the print operation, if it is determined that the print operation has been input, the determination unit allows the printing.

Thus, in the case when the data representing the environmental load due to the misprint is large, the printing process does not start if the print operation is not input with a strong force. Accordingly, it is possible to demand a user to confirm the print setting state. As a result, since it can be expected that the misprint will be reduced, it is possible to reduce the environmental load as compared with a case in the related art.

Here, the environmental load means the influence of the printing with respect to the environment. For example, the environmental load can be calculated as a cost required for the printing. This is because, as the number of sheets of paper increases, both the environmental load and the printing cost (paper cost, ink cost) in the case when the printing fails increase together. This is the same as in a printing support program for reducing an environmental load according to a twenty-second aspect of the invention and a printing support method for reducing an environmental load according to a twenty-fifth aspect of the invention, which will be described below.

In addition, as the print setting, at least one of whether or not multi-pages on a sheet of paper are to be applied, the number of multi-pages on a sheet of paper, whether or not double-sided printing is to be applied, the number of copies to be printed, and other print settings is included. This is the same as in the printing support program for reducing the environmental load according to the twenty-second aspect of the invention and the printing support method for reducing the environmental load according to the twenty-fifth aspect of the invention, which will be described below.

In addition, the environmental load calculation basis information storage unit stores the environmental load calculation basis information at every time. That is, the environmental load calculation basis information storage unit may store the environmental load calculation basis information beforehand or may store the environmental load calculation basis information by, for example, an external input at the time of an operation of the system.

In addition, the 'input' of the 'compression force at the time of the input' means an action of pressing the button. Accordingly, the 'compression force' means the resisting force of the button when the button is pressed, and the 'adjustment' means the change of the resisting force of the button when the button is pressed. In addition, the 'control' means that the resisting force of the button when the button is pressed is controlled such that the resisting force is small when the data representing the environmental load is small, for example, in a black printing, and the resisting force is large when the data representing the environmental load is large, for example, in a color printing.

In addition, the system may be implemented by means of a single device, a terminal, or other apparatuses, or may be implemented by means of a network system in which a plurality of devices, terminals, and other apparatuses are communicatably connected to one another. In the latter case, each of the components may be included in any one of the plurality of devices as long as the components are communicatably connected to one another.

Furthermore, according to a twentieth aspect of the invention, in the printing support system for reducing the environmental load according to the nineteenth aspect of the invention, preferably, the compression force control unit controls the compression force adjustment unit such that a predetermined compression force is generated when it is determined that the data representing the environmental load is equal to or larger than a predetermined value.

In this configuration, if it is determined that the data representing the environmental load is equal to or larger than the predetermined value, the compression force adjustment unit is controlled by the compression force control unit such that the predetermined compression force is generated.

Thus, it is possible to obtain the effects in which the predetermined input load can be generated when the data representing the environmental load is equal to or larger than the predetermined value.

Furthermore, according to a twenty-first aspect of the invention, in the printing support system for reducing the environmental load according to the nineteenth aspect of the invention, preferably, the compression force control unit controls the compression force adjustment unit such that a compression force corresponding to the data representing the environmental load is generated.

In this configuration, if it is determined that the data representing the environmental load is equal to or larger than the predetermined value, the compression force adjustment unit is controlled by the compression force control unit controls such that the compression force corresponding to the data representing the environmental load is generated.

Thus, it is possible to obtain the effects in which the input load corresponding to the data representing the environmental load can be generated.

Further, according to a twenty-second aspect of the invention, a printing support program for reducing an environmental load that changes an input load of a print operation depending on data representing the environmental load includes a program causing a computer to execute: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; inputting, through a print operation input unit, a print operation for instructing to start printing; controlling a compression force by controlling a compression force adjustment unit that adjusts the compression force at the time of input to the print operation input unit on the basis of the data representing the environmental load obtained in the calculating of the environmental load; and determining that printing is allowed when it is determined that the print operation performed in the inputting of the print operation has been input.

In this configuration, since the computer reads out the program and then performs the processes according to the read program, it is possible to obtain the same operations and effects as in the printing support system for reducing the environmental load according to the nineteenth aspect of the invention.

Further, according to a twenty-third aspect of the invention, in the printing support program for reducing the environmental load according to the twenty-second aspect of the invention, preferably, in the controlling the compression force, the compression force adjustment unit is controlled such that the predetermined compression force is generated when it is determined that the data representing the environmental load is equal to or larger than a predetermined value.

In this configuration, since the computer reads out the program and then performs the processes according to the read program, it is possible to obtain the same operations and effects as in the printing support system for reducing the environmental load according to the twentieth aspect of the invention.

Further, according to a twenty-fourth aspect of the invention, in the printing support program for reducing the environmental load according to the twenty-second aspect of the invention, preferably, in the controlling the compression force, the compression force adjustment unit is controlled such that the compression force corresponding to the data representing the environmental load is generated.

In this configuration, since the computer reads out the program and then performs the processes according to the read program, it is possible to obtain the same operations and effects as in the printing support system for reducing the environmental load according to the twenty-first aspect of the invention.

Furthermore, according to a twenty-fifth aspect of the invention, a printing support method for reducing an environmental load that changes an input load of a print operation depending on data representing the environmental load includes: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; inputting, through a print operation input unit, a print operation for instructing to start printing; controlling a compression force by controlling a compression force adjustment unit that adjusts the compression force at the time of input to the print operation input unit on the basis of the data representing the environmental load obtained in the calculating of the environmental load; and determining that printing is allowed when it is determined that the print operation performed in the inputting of the print operation has been input.

Thus, the same effects as in the printing support system for reducing the environmental load according to the first aspect of the invention can be obtained.

Furthermore, according to a twenty-sixth aspect of the invention, in the printing support method for reducing the environmental load according to the twenty-fifth aspect of the invention, preferably, in the controlling the compression force, the compression force adjustment unit is controlled such that the predetermined compression force is generated when it is determined that the data representing the environmental load is equal to or larger than a predetermined value.

Thus, the same effects as in the printing support system for reducing the environmental load according to the twentieth aspect of the invention can be obtained.

Furthermore, according to a twenty-seventh aspect of the invention, in the printing support method for reducing the environmental load according to the twenty-fifth aspect of the invention, preferably, in the controlling the compression force, the compression force adjustment unit is controlled such that the compression force corresponding to the data representing the environmental load is generated.

Thus, the same effects as in the printing support system for reducing the environmental load according to the twenty-first aspect of the invention can be obtained.

Further, according to a twenty-eighth aspect of the invention, a printing support system for reducing an environmental load that changes an input load of a print operation depending on data representing the environmental load includes: an environmental load calculation basis information storage unit that stores environmental load calculation basis information used to calculate the data representing the environmental load; a print setting input unit through which a print setting is input; an environmental load calculation unit that calculates the data representing the environmental load on the basis of the print setting input by the print setting input unit and the environmental load calculation basis information stored in the environmental load calculation basis information storage unit; a start instruction image display unit that displays a start instruction image for instructing to start printing within a predetermined display region; a position instruction unit that instructs the position on the display region; and a determination unit that allows printing if it is determined that an instruction of the position instruction unit with respect to a display position of the start instruction image has been made. The start instruction image display unit changes the size of the start instruction image on the basis of the data representing the environmental load calculated by the environmental load calculation unit.

In this configuration, if the print setting is input by the print setting input unit, the data representing the environmental load is calculated by the environmental load calculation unit on the basis of the input print setting and the environmental load calculation basis information stored in the environmental load calculation basis information storage unit. In addition, the size of the start instruction image is changed by the start instruction image display unit on the basis of the calculated data representing the environmental load.

In order to start printing, even if a user instructs the display position of the start instruction image by means of the position instruction unit, the print instruction may not be effective with consecutive input operations, such as consecutive clicking operations, because the size of the start instruction image changes. That is, in the case when the printing fails, if the data representing the environmental load (waste of printing paper, ink, or the like) is large, the printing instruction should be made after checking the display position of the start instruction image.

In addition, if the user instructs the start instruction image, the printing is allowed by the determination unit.

Thus, in the case when data representing the environmental load due to the misprint is large, the printing instruction should be made after checking the display position of the start instruction image. Accordingly, it is possible to demand a user to confirm the print setting state. As a result, since it can be expected that the misprint will be reduced, it is possible to reduce the environmental load as compared with a case in the related art.

Here, the environmental load means the influence of the printing with respect to the environment. For example, the environmental load can be calculated as a cost required for the printing. This is because, as the number of sheets of paper increases, both the environmental load and the printing cost (paper cost, ink cost) in the case when the printing fails increase together. This is the same as in a printing support system for reducing an environmental load according to the thirty-first or thirty-fourth aspect of the invention, a printing support program for reducing an environmental load according to one of the thirty-sixth, thirty-ninth, and forty-second aspects of the invention, and a printing support method for reducing an environmental load according to one of the forty-fourth, forty-seventh, and fiftieth aspects of the invention, which will be described below.

In addition, as the print setting, at least one of whether or not multi-pages on a sheet of paper are to be applied, the number of multi-pages on a sheet of paper, whether or not double-sided printing is to be applied, the number of copies to be printed, and other print settings is included. This is the same as in the printing support system for reducing the environmental load according to the thirty-first or thirty-fourth aspect of the invention, the printing support program for reducing the environmental load according to one of the thirty-eighth, thirty-ninth, and forty-second aspects of the invention, and the printing support method for reducing the environmental load according to one of the forty-fourth, forty-seventh, and fiftieth aspects of the invention, which will be described below.

In addition, the environmental load calculation basis information storage unit stores the environmental load calculation basis information at every time. That is, the environmental load calculation basis information storage unit may store the environmental load calculation basis information beforehand or may store the environmental load calculation basis information by, for example, an external input at the time of an operation of the system. This is the same as in the printing support system for reducing the environmental load according to the fourth or seventh aspect of the invention.

In addition, the system may be implemented by means of a single device, a terminal, or other apparatuses, or may be implemented by means of a network system in which a plurality of devices, terminals, and other apparatuses are communicatably connected to one another. In the latter case, each of the components may be included in any one of the plurality of devices as long as the components are communicatably connected to one another. This is the same as in the printing support system for reducing the environmental load according to the thirty-first or thirty-fourth aspect of the invention.

In addition, in the system according to the invention, it is assumed that only a screen and a mouse are provided. Accordingly, an action of 'moving a pointer to a specific position and then pressing the pointer' is needed in the system, instead of an action of 'pressing a return key' in a PC.

In addition, an 'image' means an image, such as a button displayed at the specific position, provided to receive event information corresponding to the action of 'moving a pointer to a specific position and then pressing the pointer'.

Furthermore, according to a twenty-ninth aspect of the invention, in the printing support system for reducing the environmental load twenty-eighth aspect of the invention, preferably, the start instruction image display unit displays the start instruction image in a first size when it is determined that the data representing the environmental load is smaller than a predetermined value, and the start instruction image display unit displays the start instruction image in a second size smaller than the first size when it is determined that the data representing the environmental load is equal to or larger than the predetermined value.

In this configuration, if it is determined that the data representing the environmental load is smaller than the predetermined value, the start instruction image display unit displays the start instruction image in the first size. On the other hand, if it is determined that the data representing the environmental load is equal to or larger than the predetermined value, the start instruction image display unit displays the start instruction image in the second size smaller than the first size.

Thus, when the data representing the environmental load is equal to or larger than the predetermined value, it is possible to obtain the effects in which the predetermined input load can be generated by making the size of the start instruction image small.

Further, according to a thirtieth aspect of the invention, in the printing support system for reducing the environmental load twenty-eighth aspect of the invention, preferably, the start instruction image display unit displays the start instruction image such that the size of the start instruction image becomes small as the data representing the environmental load increases.

In this configuration, the start instruction image display unit displays the start instruction image such that the size of the start instruction image becomes small as the data representing the environmental load increases.

Thus, it is possible to obtain the effects in which the input load corresponding to the data representing the environmental load can be generated by making the size of the start instruction image small according to the data representing the environmental load.

Furthermore, according to a thirty-first aspect of the invention, a printing support system for reducing an environmental load that changes an input load of a print operation depending on data representing the environmental load includes: an environmental load calculation basis information storage unit that stores environmental load calculation basis information used to calculate the data representing the environmental load; a print setting input unit through which a print setting is input; an environmental load calculation unit that calculates the data representing the environmental load on the basis of the print setting input by the print setting input unit and the environmental load calculation basis information stored in the environmental load calculation basis information storage unit; a start instruction image display unit that displays a start instruction image for instructing to start printing within a predetermined display region; a position instruction unit that instructs the position on the display region; and a determination unit that allows printing if it is determined that an instruction of the position instruction unit with respect to a display position of the start instruction image has been made. The start instruction image display unit changes the concentration of a color of the start instruction image on the basis of the data representing the environmental load calculated by the environmental load calculation unit.

In this configuration, if the print setting is input by the print setting input unit, the data representing the environmental load is calculated by the environmental load calculation unit on the basis of the input print setting and the environmental load calculation basis information stored in the environmental load calculation basis information storage unit. In addition, the concentration of the color of the start instruction image is changed by the start instruction image display unit on the basis of the calculated data representing the environmental load.

In order to start printing, even if a user instructs the display position of the start instruction image by means of the position instruction unit, the print instruction may not be effective with consecutive input operations, such as consecutive clicking operations, because the concentration of the color of the start instruction image changes. That is, in the case when the printing fails, if the data representing the environmental load is large, the printing instruction should be made after checking the display position of the start instruction image.

In addition, if the user instructs the start instruction image, the printing is allowed by the determination unit.

Thus, in the case when data representing the environmental load due to the misprint is large, the printing instruction should be made after checking the display position of the start instruction image. Accordingly, it is possible to demand a user to confirm the print setting state. As a result, since it can be expected that the misprint will be reduced, it is possible to reduce the environmental load as compared with a case in the related art.

Furthermore, according to a thirty-second aspect of the invention, in the printing support system for reducing the environmental load according to the thirty-first aspect of the invention, preferably, the start instruction image display unit displays the start instruction image by a first concentration when it is determined that the data representing the environmental load is smaller than a predetermined value, and the start instruction image display unit displays the start instruction image by a second concentration causing the contrast to be lower than the case of the first concentration when it is determined that the data representing the environmental load is equal to or larger than the predetermined value.

In this configuration, if it is determined that the data representing the environmental load is smaller than the predetermined value, the start instruction image is displayed by the start instruction image display unit in the first concentration. On the other hand, if it is determined that the data representing the environmental load is equal to or larger than the predetermined value, the start instruction image is displayed by the start instruction image display unit in the second concentration causing the contrast to be lower than the case of the first concentration.

Thus, when the data representing the environmental load is equal to or larger than the predetermined value, it is possible to obtain the effects in which the predetermined input load can be generated by changing the concentration of the color of the start instruction image to a concentration at which the contrast becomes low.

In addition, the 'first concentration' and the 'second concentration' each are the contrast with respect to a background color. The 'first concentration' is set by a normal design (color tone of a button), and the 'second concentration' is set to the contrast lower than in the case of the 'first concentration'. This is because, when the second concentration is selected, a printing process in which data representing an environmental load is large is to be printed.

Furthermore, according to a thirty-third aspect of the invention, in the printing support system for reducing the environmental load according to the thirty-first aspect of the invention, preferably, the start instruction image display unit displays the start instruction image such that the concentration of the start instruction image becomes low as the data representing the environmental load increases.

In this configuration, the start instruction image display unit displays the start instruction image such that the concentration of the start instruction image becomes low as the data representing the environmental load increases.

Thus, it is possible to obtain the effects in which the input load corresponding to the data representing the environmental load can be generated by making the concentration of the color of the start instruction image low according to the data representing the environmental load.

Further, according to a thirty-fourth aspect of the invention, a printing support system for reducing an environmental load that changes an input load of a print operation depending on data representing the environmental load includes: an environmental load calculation basis information storage unit that stores environmental load calculation basis information used to calculate the data representing the environmental load; a print setting input unit through which a print setting is input; an environmental load calculation unit that calculates the data representing the environmental load on the basis of the print setting input by the print setting input unit and the environmental load calculation basis information stored in the environmental load calculation basis information storage unit; a start instruction image display unit that displays a start instruction image for instructing to start printing within a predetermined display region; a position instruction unit that instructs the position on the display region; and a determination unit that allows printing if it is determined that an instruction of the position instruction unit with respect to a display position of the start instruction image has been made. The start instruction image display unit changes the position of the start instruction image on the basis of the data representing the environmental load calculated by the environmental load calculation unit.

In this configuration, if the print setting is input by the print setting input unit, the data representing the environmental load is calculated by the environmental load calculation unit on the basis of the input print setting and the environmental load calculation basis information stored in the environmental load calculation basis information storage unit. In addition, the position of the start instruction image is changed by the start instruction image display unit on the basis of the calculated data representing the environmental load.

In order to start printing, even if a user instructs the display position of the start instruction image by means of the position instruction unit, the print instruction may not be effective with consecutive input operations, such as consecutive clicking operations, because the concentration of the color of the start instruction image changes. That is, in the case when the printing fails, if the data representing the environmental load is large, the printing instruction should be made after checking the display position of the start instruction image.

In addition, if the user instructs the start instruction image, the printing is allowed by the determination unit.

Thus, in the case when data representing the environmental load due to the misprint is large, the printing instruction should be made after checking the display position of the start instruction image. Accordingly, it is possible to demand a user to confirm the print setting state. As a result, since it can be expected that the misprint will be reduced, it is possible to reduce the environmental load as compared with a case in the related art.

Furthermore, according to a thirty-fifth aspect of the invention, in the printing support system for reducing the environmental load according to the thirty-fourth aspect of the invention, preferably, the start instruction image display unit displays the start instruction image at a first position when it is determined that the data representing the environmental load is smaller than a predetermined value, and the start instruction image display unit displays the start instruction image at a second position different from the first position when it is determined that the data representing the environmental load is equal to or larger than the predetermined value.

In this configuration, if it is determined that the data representing the environmental load is smaller than the predetermined value, the start instruction image is displayed by the start instruction image display unit at the first position. On the other hand, if it is determined that the data representing the environmental load is equal to or larger than the predetermined value, the start instruction image is displayed by the start instruction image display unit at the second position different from the first position.

Thus, when the data representing the environmental load is equal to or larger than the predetermined value, it is possible to obtain the effects in which the predetermined input load can be generated by changing the position of the start instruction image.

In addition, the 'first position' is a position in the case of a normal design, and the 'second design' is a position different from a normal position (first position). This is because, when the second position is selected, a printing process in which data representing an environmental load is large is to be printed.

Furthermore, according to a thirty-sixth aspect of the invention, a printing support program for reducing an environmental load that changes an input load of a print operation depending on data representing the environmental load includes a program causing a computer to execute: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; displaying a start instruction image for instructing to start printing within a predetermined display region; and determining that printing is allowed when it is determined that an instruction of a position instruction unit with respect to a display position of the start instruction image has been made. In the displaying of the start instruction image, the size of the start instruction image is changed on the basis of the data representing the environmental load obtained in the calculating of the environmental load.

In this configuration, since the computer reads out the program and then performs the processes according to the read program, it is possible to obtain the same operations and effects as in the printing support system for reducing the environmental load according to the twenty-eighth aspect of the invention.

Furthermore, according to a thirty-seventh aspect of the invention, in the printing support program for reducing the environmental load according to the thirty-sixth aspect of the invention, preferably, in the displaying of the start instruction image, the start instruction image is displayed in a first size when it is determined that the data representing the environmental load is smaller than a predetermined value and the start instruction image is displayed in a second size smaller than the first size when it is determined that the data representing the environmental load is equal to or larger than the predetermined value.

In this configuration, since the computer reads out the program and then performs the processes according to the read program, it is possible to obtain the same operations and effects as in the printing support system for reducing the environmental load according to the twenty-ninth aspect of the invention.

Furthermore, according to a thirty-eighth aspect of the invention, in the printing support program for reducing the environmental load according to the thirty-sixth aspect of the invention, preferably, in the displaying of the start instruction image, the start instruction image is displayed such that the size of the start instruction image becomes small as the data representing the environmental load increases.

In this configuration, since the computer reads out the program and then performs the processes according to the read program, it is possible to obtain the same operations and effects as in the printing support system for reducing the environmental load according to the thirtieth aspect of the invention.

Further, according to a thirty-ninth aspect of the invention, a printing support program for reducing an environmental load that changes an input load of a print operation depending on data representing the environmental load includes a program causing a computer to execute: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; displaying a start instruction image for instructing to start printing within a predetermined display region; and determining that printing is allowed when it is determined that an instruction of a position instruction unit with respect to a display position of the start instruction image has been made. In the displaying of the start instruction image, the concentration of a color of the start instruction image is changed on the basis of the data representing the environmental load obtained in the calculating of the environmental load.

In this configuration, since the computer reads out the program and then performs the processes according to the read program, it is possible to obtain the same operations and effects as in the printing support system for reducing the environmental load according to the fourth aspect of the invention.

Furthermore, according to a fortieth aspect of the invention, in the printing support program for reducing the environmental load according to the thirty-ninth aspect of the invention, preferably, in the displaying of the start instruction image, the start instruction image is displayed by a first concentration when it is determined that the data representing the environmental load is smaller than a predetermined value and the start instruction image is displayed by a second concentration causing the contrast to be lower than the case of the first concentration when it is determined that the data representing the environmental load is equal to or larger than the predetermined value.

In this configuration, since the computer reads out the program and then performs the processes according to the read program, it is possible to obtain the same operations and effects as in the printing support system for reducing the environmental load according to the thirty-second aspect of the invention.

Furthermore, according to a forty-first aspect of the invention, in the printing support program for reducing the environmental load according to the thirty-ninth aspect of the invention, preferably, in the displaying of the start instruction image, the start instruction image is displayed such that the concentration of the start instruction image becomes low as the data representing the environmental load increases.

In this configuration, since the computer reads out the program and then performs the processes according to the read program, it is possible to obtain the same operations and effects as in the printing support system for reducing the environmental load according to the thirty-third aspect of the invention.

Further, according to a forty-second aspect of the invention, a printing support program for reducing an environmental load that changes an input load of a print operation depending on data representing the environmental load includes a program causing a computer to execute: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; displaying a start instruction image for instructing to start printing within a predetermined display region; and determining that printing is allowed when it is determined that an instruction of a position instruction unit with respect to a display position of the start instruction image has been made. In the displaying of the start instruction image, the position of the start instruction image is changed on the basis of the data representing the environmental load obtained in the calculating of the environmental load.

In this configuration, since the computer reads out the program and then performs the processes according to the read program, it is possible to obtain the same operations and effects as in the printing support system for reducing the environmental load according to the thirty-fourth aspect of the invention.

Furthermore, according to a forty-third aspect of the invention, in the printing support program for reducing the environmental load according to the forty-second aspect of the invention, preferably, in the displaying of the start instruction image, the start instruction image is displayed at a first position when it is determined that the data representing the environmental load is smaller than a predetermined value and the start instruction image is displayed at a second position different from the first position when it is determined that the data representing the environmental load is equal to or larger than the predetermined value.

In this configuration, since the computer reads out the program and then performs the processes according to the read program, it is possible to obtain the same operations and effects as in the printing support system for reducing the environmental load according to the forth-second aspect of the invention.

Further, according to a forty-fourth aspect of the invention, a printing support method for reducing an environmental load that changes an input load of a print operation depending on data representing the environmental load includes: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; displaying a start instruction image for instructing to start printing within a predetermined display region; and determining that printing is allowed when it is determined that an instruction of a position instruction unit with respect to a display position of the start instruction image has been made. In the displaying of the start instruction image, the size of the start instruction image is changed on the basis of the data representing the environmental load obtained in the calculating of the environmental load.

Thus, the same effects as in the printing support system for reducing the environmental load according to the first aspect of the invention can be obtained.

Furthermore, according to a forty-fifth aspect of the invention, in the printing support method for reducing the environmental load according to the forty-fourth aspect of the invention, preferably, in the displaying of the start instruction image, the start instruction image is displayed in a first size when it is determined that the data representing the environmental load is smaller than a predetermined value and the start instruction image is displayed in a second size smaller than the first size when it is determined that the data representing the environmental load is equal to or larger than the predetermined value.

Thus, the same effects as in the printing support system for reducing the environmental load according to the twenty-ninth aspect of the invention can be obtained.

Furthermore, according to a forty-sixth aspect of the invention, in the printing support method for reducing the environmental load according to the forty-fourth aspect of the invention, preferably, in the displaying of the start instruction image, the start instruction image is displayed such that the size of the start instruction image becomes small as the data representing the environmental load increases.

Thus, the same effects as in the printing support system for reducing the environmental load according to the thirtieth aspect of the invention can be obtained.

Further, according to a forty-seventh aspect of the invention, a printing support method for reducing an environmental load that changes an input load of a print operation depending on data representing the environmental load includes: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; displaying a start instruction image for instructing to start printing within a predetermined display region; and determining that printing is allowed when it is determined that an instruction of a position instruction unit with respect to a display position of the start instruction image has been made. In the displaying of the start instruction image, the concentration of a color of the start instruction image is changed on the basis of the data representing the environmental load obtained in the calculating of the environmental load.

Thus, the same effects as in the printing support system for reducing the environmental load according to the thirty-first aspect of the invention can be obtained.

Furthermore, according to a forty-eighth aspect of the invention, in the printing support method for reducing the environmental load according to the forty-seventh aspect of the invention, preferably, in the displaying of the start instruction image, the start instruction image is displayed by a first concentration when it is determined that the data representing the environmental load is smaller than a predetermined value and the start instruction image is displayed by a second concentration causing the contrast to be lower than the case of the first concentration when it is determined that the data representing the environmental load is equal to or larger than the predetermined value.

Thus, the same effects as in the printing support system for reducing the environmental load according to the thirty-second aspect of the invention can be obtained.

Furthermore, according to a forty-ninth aspect of the invention, in the printing support method for reducing the environmental load according to the forty-seventh aspect of the invention, preferably, in the displaying of the start instruction image, the start instruction image is displayed such that the concentration of the start instruction image becomes low as the data representing the environmental load increases.

Thus, the same effects as in the printing support system for reducing the environmental load according to the thirty-third aspect of the invention can be obtained.

Further, according to a fiftieth aspect of the invention, a printing support method for reducing an environmental load that changes an input load of a print operation depending on data representing the environmental load includes: inputting a print setting; calculating the environmental load by calculating the data representing the environmental load on the basis of the print setting made in the inputting of the print setting and environmental load calculation basis information stored in an environmental load calculation basis information storage unit used to calculate the data representing the environmental load; displaying a start instruction image for instructing to start printing within a predetermined display region; and determining that printing is allowed when it is determined that an instruction of a position instruction unit with respect to a display position of the start instruction image has been made. In the displaying of the start instruction image, the position of the start instruction image is changed on the basis of the data representing the environmental load obtained in the calculating of the environmental load.

Thus, the same effects as in the printing support system for reducing the environmental load according to the thirtieth aspect of the invention can be obtained.

Furthermore, according to a fifty-first aspect of the invention, in the printing support method for reducing the environmental load according to the fiftieth aspect of the invention, preferably, in the displaying of the start instruction image, the start instruction image is displayed at a first position when it is determined that the data representing the environmental load is smaller than a predetermined value and the start instruction image is displayed at a second position different from the first position when it is determined that the data representing the environmental load is equal to or larger than the predetermined value.

Thus, the same effects as in the printing support system for reducing the environmental load according to the thirty-fifth aspect of the invention can be obtained.

BRIEF DESCRIPTION OF THE DRAWINGS

The invention will be described with reference to the accompanying drawings, wherein like numbers reference like elements.

FIG. 4 is a view illustrating the data structure of a paper cost calculation basis table.

FIG. 5 is a view illustrating the data structure of a depreciation cost calculation basis table.

FIG. 8 is a view illustrating a print dialog screen.

FIG. 9 is a view illustrating a print dialog screen.

FIG. 15 is a view illustrating the data structure of a paper cost calculation basis table.

FIG. 16 is a view illustrating the data structure of an ink cost calculation basis table.

DESCRIPTION OF EXEMPLARY EMBODIMENTS

Hereinafter, exemplary embodiments of the invention will be described with reference to the accompanying drawings.

First Embodiment

Hereinafter, a first embodiment of the invention will be described with reference to the accompanying drawings.

FIGS. 1 to 9 are views illustrating a printing support system for reducing an environmental load, a printing support program for reducing an environmental load, and a printing support method for reducing an environmental load according to the first embodiment of the invention.

In the present embodiment, the printing support system for reducing an environmental load, the printing support program for reducing an environmental load, and the printing support method for reducing an environmental load according to the invention are applied to a printer driver of a host terminal 100.

First, a functional outline of a network system to which the invention is applied will be described.

Figure 1:
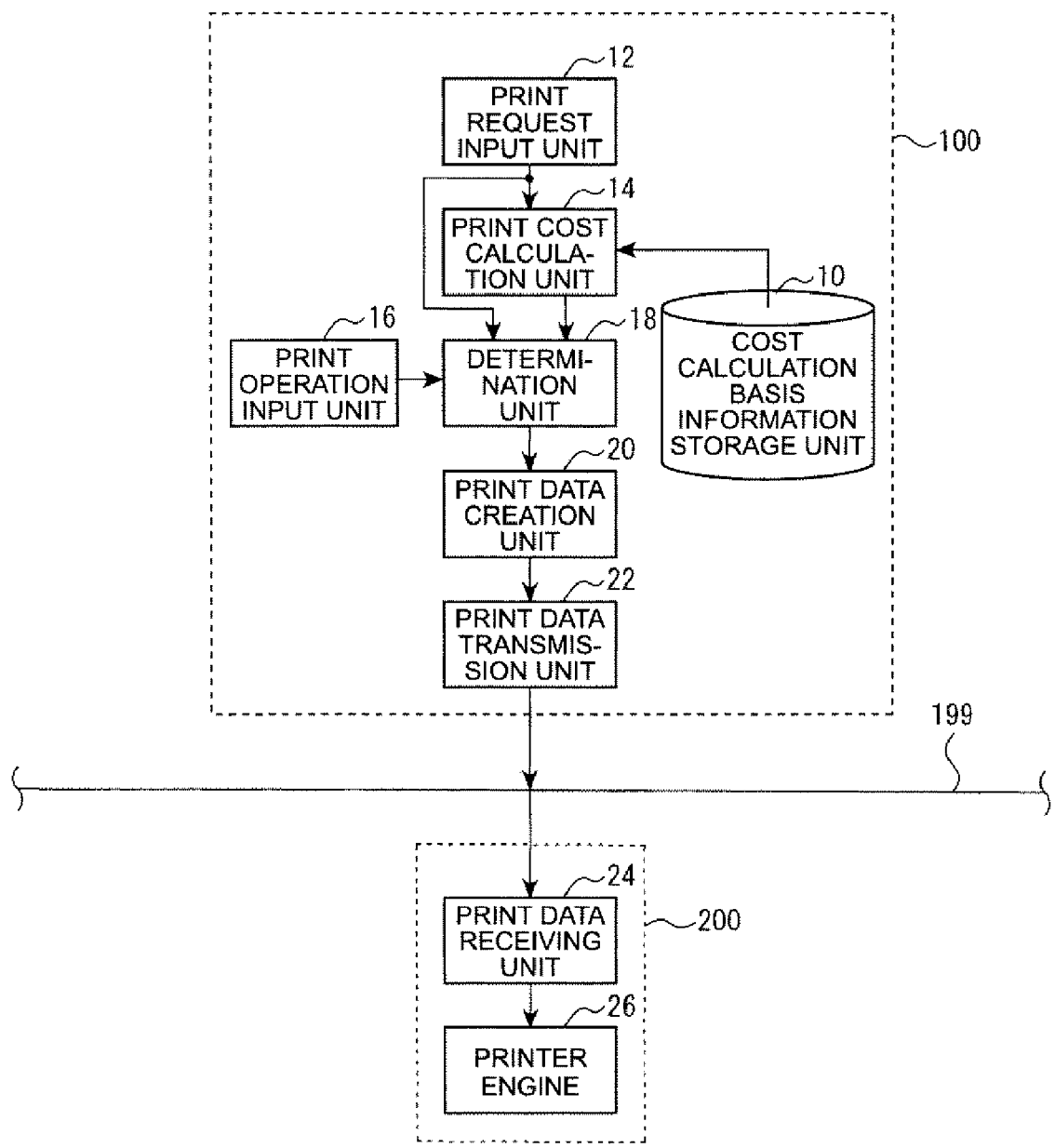
FIG. 1 is a functional block diagram illustrating a functional outline of a network system.

FIG. 1 is a functional block diagram illustrating the functional outline of the network system.

As shown in FIG. 1, a host terminal 100 that a user uses and a network printer 200 are connected to a network 199.

The host terminal 100 includes a cost calculation basis information storage unit 10 that stores cost calculation basis information used to calculate a print cost, a print request input unit 12 through which a print request including a print setting is input, and a print cost calculation unit 14 that calculates the print cost on the basis of the print request input by the print request input unit 12 and the cost calculation basis information stored in the cost calculation basis information storage unit 10.

In addition, the host terminal 100 further includes a print operation input unit 16 through which a print operation for instructing to start printing is input and a determination unit 18 that, if it is determined that a print operation through the print operation input unit 16 has been input consecutively and continuously for more than a predetermined period of time on the basis of the print cost calculated by the print cost calculation unit 14, allows printing according to the print request.

In addition, the host terminal 100 further includes a print data creation unit 20 that creates print data on the basis of document data according to the print request allowed by the determination unit 18 and a print data transmission unit 22 that transmits the print data created by the print data creation unit 20 to the network printer 200.

The network printer 200 includes a print data receiving unit 24 that receives the print data and a printer engine 26 that performs printing on the basis of the print data received by the print data receiving unit 24.

Next, the configuration of the host terminal 100 will be described.

Figures 2, 3:
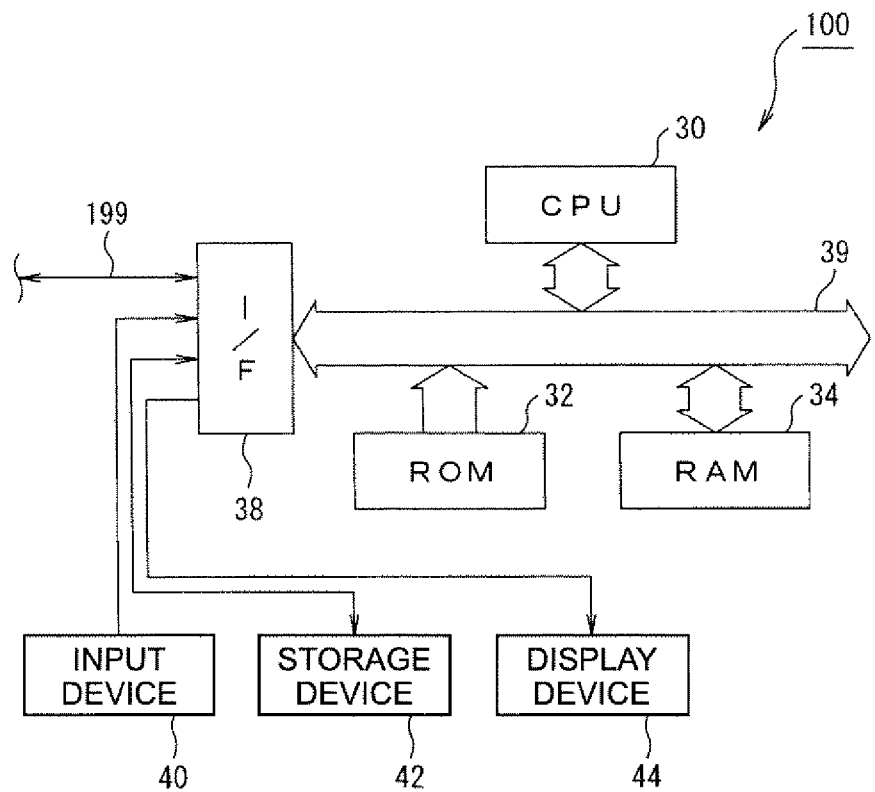
FIG. 2 is a view illustrating the hardware configuration of a host terminal.
FIG. 3 is a view illustrating the data structure of an ink cost calculation basis table.

FIG. 2 is a block diagram illustrating the hardware configuration of the host terminal 100.

As shown in FIG. 2, the host terminal 100 includes a CPU 30 that controls an overall system and operations on the basis of a control program, a ROM 32 that stores, for example, the control program of the CPU 30 in a predetermined region, a RAM 34 that stores data read from the ROM 32 or an operation result which is needed during an operation process of the CPU 30, and an I/F 38 through which data is input/output with respect to an external device. Data transmission among the CPU 30, the ROM 32, the RAM 34, and the I/F 38 is performed through a bus 39 which is a signal line provided to transmit data.

An input device 40, such as a keyboard or a mouse serving as a human interface unit, through which data can be input, a storage device 42 that stores data, tables, or the like as a file, a display device 44 that displays a screen on the basis of an image signal, and a signal line for connection with a network 199, which are all external devices, are connected to the I/F 38.

Next, a data structure of the storage device 42 will be described.

The storage device 42 stores ink cost calculation basis table 400 that is used to calculate the ink cost.

FIG. 3 is a view illustrating the data structure of the ink cost calculation basis table 400.

As shown in FIG. 3, on the ink cost calculation basis table 400, one record is registered for each ink color. Each record includes a field 402 used to register an ink color and a field 404 used to register ink cost necessary for forming one dot.

In an example shown in FIG. 3, in the third-column record, 'black (K)' and '0.000001' are registered as the ink color and the cost, respectively. This represents that, when a printing process is performed by using the black ink, the ink cost is 0.000001 Yen per dot.

In addition, the storage device 42 stores a paper cost calculation basis table 420 that is used to calculate the paper cost.

FIG. 4 is a view illustrating the data structure of the paper cost calculation basis table 420.

As shown in FIG. 4, on the paper cost calculation basis table 420, one record is registered for each size of printing paper. Each record includes a field 422 used to register the size of printing paper and a field 424 used to register ink cost per printing paper.

In an example shown in FIG. 4, in the third-column record, 'A3' and '10' are registered as the paper size and the cost, respectively. This represents that, when a printing process is performed by using an A3-sized printing paper, the paper cost is 10 Yen per printing paper.

In addition, the storage device 42 stores a depreciation cost calculation basis table 440 that is used to calculate the depreciation cost.

FIG. 5 is a view illustrating the data structure of the depreciation cost calculation basis table 440.

As shown in FIG. 5, on the depreciation cost calculation basis table 440, one record is registered for each print mode. Each record includes a field 442 used to register the print mode and a field 444 used to register the depreciation cost per single-sided printing according to the print mode.

In an example shown in FIG. 5, in the second-column record, 'A3 color' and '1' are registered as the print mode and the cost, respectively. This represents that, when single-sided printing process is performed in the A3 color mode, the depreciation cost is 1 Yen per printing. In the case of double-sided printing, the depreciation cost is 2 Yen.

Referring back to FIG. 2, the CPU 30 is composed of, for example, a micro processing unit. The CPU 30 runs a predetermined program stored in a predetermined region of the ROM 32 and then executes a print request process shown in a flow chart of FIG. 6 in accordance with the program.

Figure 6:
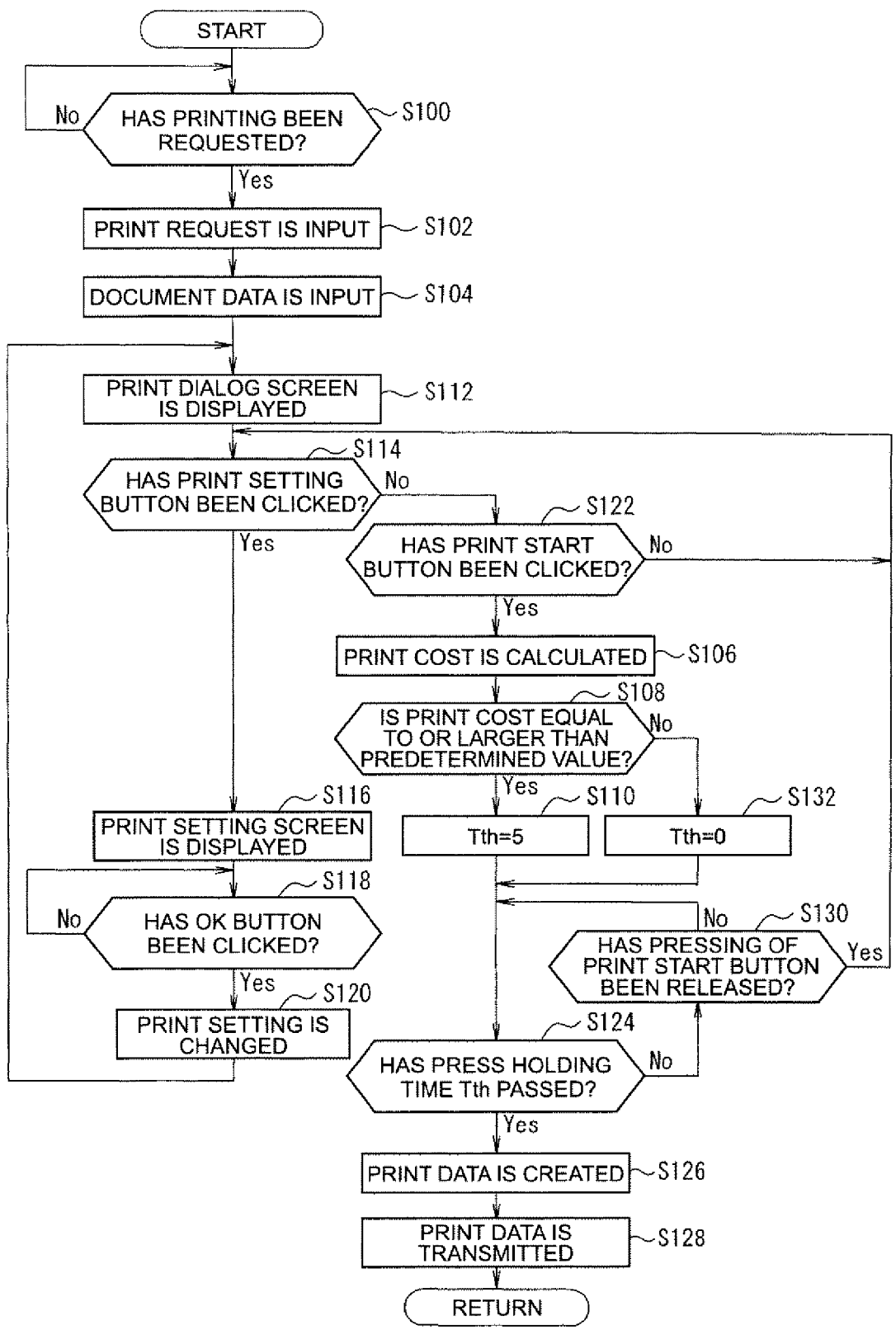
FIG. 6 is a flow chart illustrating a print request process.

FIG. 6 is a flow chart illustrating a print request process.

The print request process is a process that requests the network printer 200 to perform a printing. As shown in FIG. 6, if the CPU 30 executes the print request process, the process proceeds to step S100.

In step S100, it is determined whether or not a printing request has been requested from a document creation application or the like. Then, if it is determined that the printing request has been requested (Yes), the process proceeds to step S102, but if it is determined that the printing request has not been requested (No), the process waits at step S100 until a request printing is requested.

In step S102, a print request including a print setting, such as multi-pages on a sheet of paper or double-sided printing, is input from the document creation application or the like, and then the process proceeds to step S104. In step S104, document data according to the print request is input from the document creation application or the like, and then the process proceeds to step S112. In step S112, a print dialog screen is displayed on the display device 44, and then the process proceeds to step S114.

In step S114, it is determined whether or not a print setting button displayed on the print dialog screen has been clicked. If it is determined that the print setting button has been clicked (Yes), the process proceeds to step S116. In step S116, a print setting screen for changing the print setting state is displayed on the display device 44, and then the process proceeds to step S118.

In step S118, it is determined whether or not an OK button displayed on the print setting screen has been clicked. If it is determined that the OK button has been clicked (Yes), the process proceeds to step S120. In step S120, the print setting state is changed as set on the print setting screen, and then the process proceeds to step S112.

On the other hand, in step S118, if it is determined that the OK button has not been clicked (No), the process waits at step S118 until the OK button is clicked. In addition, if it is determined that a cancel button displayed on the print setting screen has been clicked, the process proceeds to step S112 without changing the print setting state.

On the other hand, in step S114, if it is determined that the print setting button has not been clicked (No), the process proceeds to step S122. In step S122, it is determined whether or not a print start button displayed on the print dialog screen has been clicked (for example, whether a click button is pressed in a mouse operation). If it is determined that the print start button has been clicked (Yes), the process proceeds to step S106.

In step S106, a print cost is calculated on the basis of the input print request and document data, the ink cost calculation basis table 400, the paper cost calculation basis table 420, and the depreciation cost calculation basis table 440. For example, when a black document is printed out under the condition in which the size is A4, the number of pages is 30, and the average dot number per page is 140000 dots, a print cost p can be calculated by the following equation (1) in the case when an equivalent-size and single-sided printing process is performed without page separation.

Ink cost $p1$=black (0.000001 Yen)×140000×30=4.2 Yen

Paper cost $p2$=$A4$ (5 Yen)×30 sheets of paper=150 Yen

Depreciation cost $p3$=$A4$ black (0.1 Yen)× 30 (times)=3 Yen $$\text{Print cost } p=p1+p2+p3=4.2+150+3=157.2 \text{ Yen} \quad (1)$$

Further, when double-sided printing process is performed under a condition of two pages on a sheet of paper, the print cost can be calculated by the following equation (2). In this case, the number of dots becomes 0.7 times due to the reduction of A4→A5 and the number of sheets of paper becomes 30/4+1=8.

Ink cost $p1$=black (0.000001 Yen)×140000×0.7× 30=0.3 Yen

Paper cost $p2$=$A4$ (5 Yen)×8 sheets of paper=40 Yen

Depreciation cost $p3$=$A4$ black (0.1 Yen)× 15 (times)=1.5 Yen $$\text{Print cost } p=p1+p2+p3=0.3+40+1.5=41.8 \text{ Yen} \quad (2)$$

Furthermore, in order to calculate even more detailed print cost, a technique disclosed in JP-A-6-227006 can be used, for example.

Subsequently, the process proceeds to step S108. In step S108, it is determined whether or not the calculated print cost is equal to or larger than a predetermined value (for example, 100 Yen). If it is determined that the print cost is equal to or larger than the predetermined value (Yes), the process proceeds to step S110. In step S110, a variable Tth for storing a press holding time required until a printing request is allowed is set to, for example, '5', and then the process proceeds to step S124.

In step S124, it is determined whether or not the press holding time Tth has passed after pressing the print start button. If it is determined that the press holding time Tth has passed (Yes), the process proceeds to step S126. In step S126, print data is created on the basis of input document data, and the process proceeds to step S128. In step S128, the created print data is transmitted to the network printer 200, and thus the series of processes described above are completed, returning to an original process.

On the other hand, in step S124, if it is determined that the press holding time Tth has not passed (No), the process proceeds to step S130. In step S130, it is determined whether or not the pressing of the print start button has been released. If it is determined that the pressing of the print start button has been released (Yes), the process proceeds to step S114.

On the other hand, in step S130, if it is determined that the pressing of the print start button has not been released (No), the process proceeds to step S124.

On the other hand, in step S108, if it is determined that the print cost is smaller than the predetermined value (No), the process proceeds to step S132. In step S132, the variable Tth is set to '0', and the process proceeds to step S124.

On the other hand, in step S122, if it is determined that the print start button has not been pressed (No), the process proceeds to step S114.

Next, an operation of the present embodiment will be described.

A user requests a printing request by a document creation application in the host terminal 100.

In the host terminal 100, if the printing is requested, the print request and document data are input and a print dialog screen is displayed through steps S102, S104, and S112.

Figure 7:
FIG. 7 is a view illustrating a print dialog screen.
Figure 9:
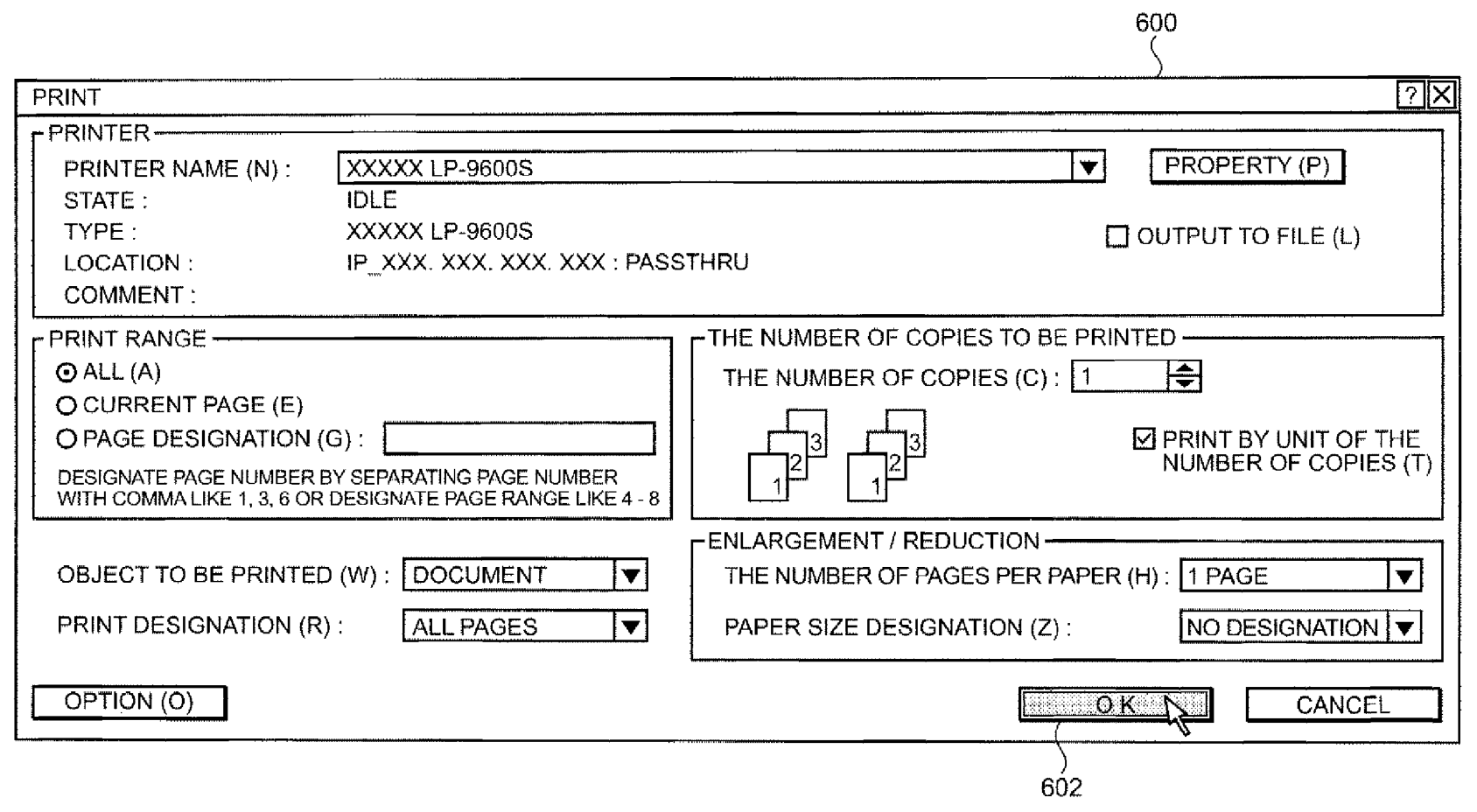

FIGS. 7 to 9 are views illustrating the print dialog screen.

Next, as shown in FIG. 7, the user clicks a print start button 602 on the print dialog screen 600.

In the host terminal 100, if the print start button 602 is clicked, the print cost is calculated on the basis of the print request and the document data input in step S106 and the cost calculation basis tables 400, 420, and 440. At this time, if it is determined that the print cost is equal to or larger than the predetermined value, the variable Tth is set to '5' in step S110. For this reason, the print operation does not start only by clicking the print start button 602. In this case, it is necessary that the user keeps pressing the print start button 602 continuously for a predetermined period of time. As shown in FIG. 8, if the print start button 602 is pressed, a color of the print start button 602 varies in a manner in which a progress bar varies. Assuming that the horizontal width of the print start button 602 is 100%, of a region of the print start button 602, only a portion corresponding to a ratio of a period of time passed after pressing the print start button 602 with respect to the press holding time Tth is changed to a dark color. Since the press holding time Tth is set to '5', in the case when the print start button 602 keeps being pressed continuously for five seconds, the whole print start button 602 is changed to a dark color and thus the printing starts, as shown in FIG. 9.

In the host terminal 100, when the printing process starts, the print data is created and the created print data is transmitted to the network printer 200 through steps S126 and S128.

In the network printer 200, when the print data is received by the print data receiving unit 24, the printing process starts by the printer engine 26 on the basis of the received print data.

Further, the user notices that the printing process does not start even if the print start button 602 is clicked, and then the user clicks a print setting button 604 on the print dialog screen 600 shown in FIG. 7 in order to check the print setting state. In the host terminal 100, when the print setting button 604 is clicked, the print setting screen is displayed.

The user checks the print setting state on the print setting screen, and then changes the print setting state if there is a setting error. For example, in the case in which the user intends to perform single-sided printing but double-sided printing is set as a default, the user changes double-sided printing to single-sided printing. If the printing setting is completed, the user clicks an OK button on the print setting screen.

In the host terminal 100, if the OK button is clicked, the print dialog screen is displayed in step S112. Then, in the same procedures as described above, the print operation is started by continuously pressing the print start button 602 for more than a predetermined period of time.

In addition, in the host terminal 100, if it is determined that the print cost is smaller than the predetermined value, the variable Tth is set to '0' in step S132. In this case, it is possible for the user to start the printing process only by clicking the print start button 602. In the case when the print cost is small, since data indicating an environmental load is small even though misprint occurs, the convenience of the user has priority.

As such, in the present embodiment, the print request including the print setting is input, the print cost is calculated on the basis of the input print request and the cost calculation basis information, and in the case when the calculated print cost is equal to or larger than a predetermined value, the printing is allowed if it is determined that the print operation has been input consecutively and continuously for more than the predetermined period of time.

Therefore, as a response to the print request in which data representing the environmental load (waste of printing paper, ink, or the like) is large, in the case when entire printed matter is definitely needed, the printing process does not start if the print operation is not input continuously for a long period of time. Accordingly, it is possible to demand a user to confirm the print setting state. As a result, since it can be expected that the misprint will be reduced, it is possible to reduce the environmental load as compared with a case in the related art.

In the first embodiment described above, the cost calculation basis information corresponds to the environmental load calculation basis information in the first, seventh, or thirteenth aspect of the invention, the cost calculation basis information storage unit 10 corresponds to the environmental load calculation basis information storage unit in the first, seventh, or thirteenth aspect of the invention, and the print request input unit 12 and step S102 each correspond to the print request input unit in the first aspect of the invention. In addition, step S102 corresponds to the print request input process in the seventh or thirteenth aspect of the invention, the print cost calculation unit 14 and step S106 each correspond to the environmental load calculation unit in the first aspect of the invention, and step S106 corresponds to the environmental load calculation process in the seventh or thirteenth aspect of the invention.

Further, in the first embodiment, the print operation input unit 16 and the input device 40 each correspond to the print operation input unit in the first aspect of the invention, the determination unit 18 and steps S122, S124, and S130 each correspond to the determination unit in the first aspect of the invention, and steps S122, S124, and S130 each correspond to the determination process in the seventh, eighth, thirteenth, or fourteenth aspect of the invention.

Second Embodiment

Next, a second embodiment of the invention will be described with reference to the accompanying drawings.

Figure 10:
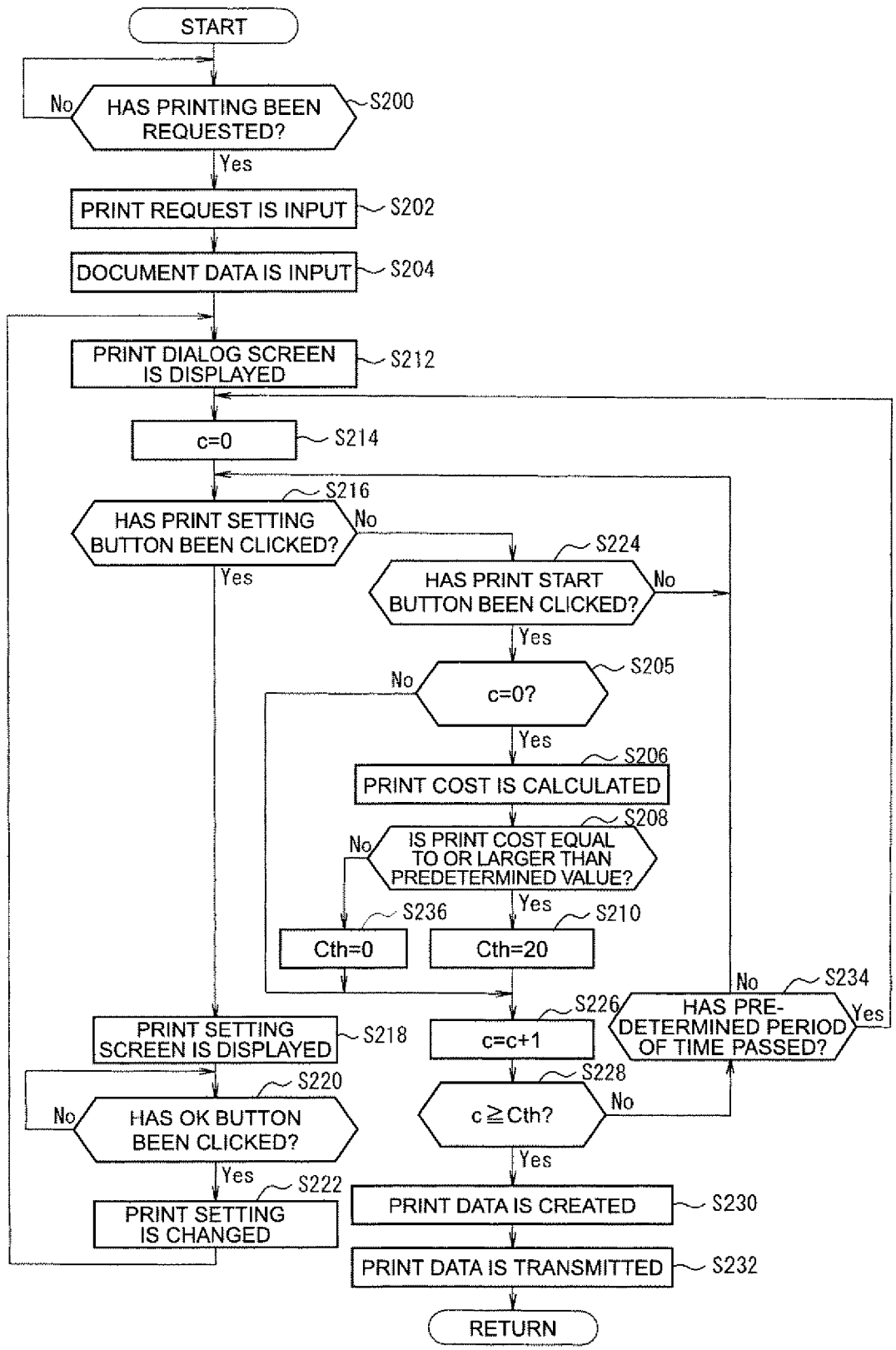
FIG. 10 is a flow chart illustrating a print request process.

FIG. 10 is a view illustrating a printing support system for reducing an environmental load, a printing support program for reducing an environmental load, and a printing support method for reducing an environmental load according to the second embodiment of the invention.

In the present embodiment, the printing support system for reducing an environmental load, the printing support program for reducing an environmental load, and the printing support method for reducing an environmental load according to the invention are applied to a printer driver of the host terminal 100. The second embodiment is different from the first embodiment in that it is determined whether or not a printing process is allowed on the basis of the number of input times not an input period of time of the print operation. In addition, only the parts different from the first embodiment will be described hereinafter. In addition, the same parts as in the first embodiment are denoted by the same reference numerals, and detailed explanation thereof will be omitted.

First, a configuration of the host terminal 100 will be described.

The CPU 30 performs a print request process shown in a flow chart of FIG. 10, instead of the print request process shown in FIG. 6.

FIG. 10 is a flow chart illustrating the print request process.

As shown in FIG. 10, if the CPU 30 executes the print request process, the process proceeds to step S200.

In step S200, it is determined whether or not a printing has been requested from a document creation application or the like. Then, if it is determined that the printing has been requested (Yes), the process proceeds to step S202, but if it is determined that the printing has not been requested (No), the process waits in step S200 until a printing is requested.

In step S202, a print request including a print setting, such as multi-pages on a sheet of paper or double-sided printing, is input from the document creation application or the like, and then the process proceeds to step S204. In step S104, document data according to the print request is input from the document creation application or the like, and then the process proceeds to step S212. In step S212, a print dialog screen is displayed on the display device 44, and then the process proceeds to step S214.

In step S214, a variable c for counting the number of clicking times is set to '0', and then the process proceeds to step S216. In step S216, it is determined whether or not a print setting button displayed on the print dialog screen has been clicked. If it is determined that the print setting button has been clicked (Yes), the process proceeds to step S218. In step S218, a print setting screen for changing the print setting state is displayed on the display device 44, and then the process proceeds to step S220.

In step S220, it is determined whether or not an OK button displayed on the print setting screen has been clicked. If it is determined that the OK button has been clicked (Yes), the process proceeds to step S222. In step S222, the print setting state is changed as set on the print setting screen, and then the process proceeds to step S212.

On the other hand, in step S220, if it is determined that the OK button has not been clicked (No), the process waits in step S220 until the OK button is clicked. In addition, if it is determined that a cancel button displayed on the print setting screen has been clicked, the process proceeds to step S212 without changing the print setting state.

On the other hand, in step S216, if it is determined that the print setting button has not been clicked (No), the process proceeds to step S224. In step S224, it is determined whether or not a print start button displayed on the print dialog screen has been clicked. If it is determined that the print start button has been clicked (Yes), the process proceeds to step S205.

In step S205, it is determined whether or not a value of the variable c is set to '0'. If it is determined that the value of the variable c is set to '0', the process proceeds to step S206. In step S206, a print cost is calculated on the basis of the input print request and document data, the ink cost calculation basis table 400, the paper cost calculation basis table 420, and the depreciation cost calculation basis table 440, and the process proceeds to step S208.

In step S208, it is determined whether or not the calculated print cost is equal to or larger than a predetermined value. If it is determined that the print cost is equal to or larger than the predetermined value (Yes), the process proceeds to step S210.

In step S210, a variable Cth for storing the number of clicking times required until a printing is allowed is set to, for example, '20', and then the process proceeds to step S226.

In step S226, the value of the variable c is incremented by '1', and then the process proceeds to step S228. In step S228, it is determined whether or not the value of the variable c is equal to or larger than the variable Cth. If it is determined the value of the variable c is equal to or larger than the variable Cth (Yes), the process proceeds to step S230. In step S230, the print data is created on the input document data, and then the process proceeds to step S232. In step S232, the created print data is transmitted to the network printer 200, and thus the series of processes described above are completed, returning to an original process.

On the other hand, in step S228, if it is determined that the value of the variable c is smaller than the variable Cth (No), the process proceeds to step S234. In step S234, it is determined whether or not a predetermined period of time (for example, 10 seconds) has passed after first clicking the print start button. If it is determined that the predetermined period of time has passed (Yes), the process proceeds to step S214.

On the other hand, in step S234, if it is determined that the predetermined period of time has not passed (No), the process proceeds to step S216.

On the other hand, in step S208, if it is determined that the print cost is smaller than the predetermined value (No), the process proceeds to step S236. In step S236, the variable Cth is set to '0', and the process proceeds to step S226.

On the other hand, in step S205, if it is determined that the value of the variable c is not '0' (No), the process proceeds to step S226.

On the other hand, in step S224, if it is determined that the print start button has not been clicked (No), the process proceeds to step S216.

Next, an operation of the present embodiment will be described.

A user requests a printing through a document creation application in the host terminal 100.

In the host terminal 100, if the printing is requested, the print request and document data are input and a print dialog screen is displayed through steps S202, S204, and S212.

Next, the user clicks a print start button on a print dialog screen.

In the host terminal 100, if the print start button is clicked, the print cost is calculated on the basis of the print request and the document data input in step S206 and the cost calculation basis tables 400, 420, and 440. At this time, if it is determined that the print cost is equal to or larger than the predetermined value, the variable Cth is set to '20' in step S210. For this reason, the print operation does not start only by clicking the print start button. In this case, it is necessary that the user click the print start button more than the predetermined number of times within a predetermined period of time. If the print start button is clicked, a color of the print start button varies in a manner in which a progress bar varies. Assuming that the horizontal width of the print start button is 100%, of a region of the print start button, only a portion corresponding to a ratio of the actual clicking number of times c with respect to the clicking number of times Cth is changed to a dark color. Since the clicking number of times Cth is set to '20', in the case when the print start button is clicked 20 times within a predetermined period of time, the whole print start button is changed to a dark color and thus the printing starts.

In the host terminal 100, when the printing process starts, the print data is created and the created print data is transmitted to the network printer 200 through steps S230 and S232.

In addition, in the host terminal 100, if it is determined that the print cost is smaller than the predetermined value, the variable Cth is set to '0' in step S236. In this case, it is possible for the user to start the printing process only by clicking the print start button once. In the case when the print cost is small, since the environmental load is small even though the misprint occurs, the convenience of the user has priority.

As such, in the present embodiment, the print request including the print setting is input, the print cost is calculated on the basis of the input print request and the cost calculation basis information, and in the case when the calculated print cost is equal to or larger than a predetermined value, the printing is allowed if it is determined that the print operation has been input continuously more than the predetermined number of times.

Therefore, in the case when data representing the environmental load due to the misprint is large, the printing process does not start if the print operation is not input continuously more than the predetermined number of times. Accordingly, it is possible to demand a user to confirm the print setting state. As a result, since it can be expected that the misprint will be reduced, it is possible to reduce the environmental load as compared with a case in the related art.

In the second embodiment described above, the print request input unit 12 and step S202 each correspond to the print request input unit in the fourth aspect of the invention, step S202 corresponds to the print request input process in the tenth or sixteenth aspect of the invention, and the print cost calculation unit 14 and step S206 each correspond to the environmental load calculation unit in the fourth aspect of the invention. In addition, step S206 corresponds to the environmental load calculation process in the tenth or sixteenth aspect of the invention, the print operation input unit 16 and the input device 40 each correspond to the print operation input unit in the fourth aspect of the invention, and the determination unit 18 and steps S228 and S234 each correspond to the determination unit in the fourth or fifth aspect of the invention.

Further, in the second embodiment, steps S228 and S234 each correspond to the determination process in the tenth, eleventh, sixteenth, or seventeenth aspect of the invention.

Furthermore, in the first embodiment, in the case when the print cost is equal to or larger than the predetermined value, if it is determined that the print operation has been input continuously for more than the predetermined period of time, the printing process is allowed. However, the invention is not limited thereto. For example, if it is determined that the print operation has been input consecutively and continuously more than a period of time according to the print cost, the printing process may be allowed.

In this case, the press holding time Tth can be calculated by the following equation (3), for example.

$$Tth = \text{print cost } p/20 \tag{3}$$

Furthermore, in the second embodiment, in the case when the print cost is equal to or larger than the predetermined value, if it is determined that the print operation has been input continuously more than the predetermined number of times, the printing process is allowed. However, the invention is not limited thereto. For example, if it is determined that the print operation has been input continuously more than the number of times according to the print cost, the printing process may be allowed.

In this case, the clicking number of times Cth can be calculated by the following equation (4), for example.

$$Cth = \text{print cost } p/5 \tag{4}$$

Furthermore, in the first and second embodiments, the print data is created after the printing is allowed. However, the invention is not limited thereto. For example, in the first embodiment, the print data may be created through steps S102 to S124, and in the second embodiment, the print data may be created through steps S202 to S228.

Furthermore, in the second embodiment, if it is determined that the print start button has been clicked for a predetermined number of times within a predetermined period of time, the printing process is allowed. However, the invention is not limited thereto. For example, the limitation on the period of time may not be set.

Furthermore, in the first embodiment, in the case when the print cost is equal to or larger than the predetermined value, the press holding time Tth is set to '5', but the value is only an example and other values may be set according to the necessity. This can also be applied to a configuration in which the press holding time Tth increases according to the print cost in a consecutive or stepwise manner.

Furthermore, in the second embodiment, in the case when the print cost is equal to or larger than the predetermined value, the number of clicking times is set to '20', but the value is only an example and other values may be set according to the necessity. This can also be applied to a configuration in which the number of clicking times increases according to the print cost in a consecutive or stepwise manner.

Furthermore, in the first and second embodiments, the print cost is calculated on the basis of the print request, the document data, and various cost calculation basis tables 400, 420, and 440. However, the invention is not limited thereto. For example, the print cost may be calculated on the basis of one of the cost calculation basis tables 400, 420, and 440. In addition, when the depreciation cost calculation basis table 440 is not used, the document data is not needed.

Further, in the first and second embodiments, the cost calculation basis information storage unit 10 is provided in the host terminal 100. However, the invention is not limited thereto. For example, the cost calculation basis information storage unit 10 may be provided in a terminal other than the host terminal 100 and the network printer 200.

Furthermore, in the first and second embodiments, when the processes shown in flow charts of FIGS. 6 and 10 are performed, the case in which the control program stored beforehand in the ROM 32 is executed has been described. However, the invention is not limited thereto. For example, it is possible to cause the RAM 34 to read out the program, in which the procedures are instructed, from a storage medium on which the program is stored and then to run the program.

Here, the storage medium includes a semiconductor storage medium such as a RAM or a ROM, a magnetic-storage-type storage medium such as an FD or an HD, an optical-reading-type storage medium such as a CD, a CDV, a LD, or a DVD, and a magnetic-storage/optical-reading type storage medium such as a MO. Specifically, the storage medium includes all kinds of storage mediums as long as the storage mediums can be read out by means of a computer, regardless of a reading method, such as the electronic, magnetic, and optical reading methods.

Furthermore, in the first and second embodiments, the printing support system for reducing an environmental load, the printing support program for reducing an environmental load, and the printing support method for reducing an environmental load according to the invention have been applied to the printer driver of the host terminal 100. However, the invention is not limited thereto. For example, the printing support system for reducing an environmental load, the printing support program for reducing an environmental load, and the printing support method for reducing an environmental load according to the invention may be applied to other devices without departing from the scope of the invention. For example, instead of the network printer 200, the printing support system for reducing an environmental load, the printing support program for reducing an environmental load, and the printing support method for reducing an environmental load according to the invention may be applied to other devices, such as a projector, an electronic paper, a home gateway, a personal computer, a PDA (personal digital assistant), a network storage, an audio device, a mobile phone, a PHS (registered trademark: personal handyphone system), a watch-type PDA, a STB (set top box), a POS (point of sale) terminal, a facsimile device, or a phone (including an IP phone).

Third Embodiment

Hereinafter, a third embodiment of the invention will be described with reference to the accompanying drawings.

FIGS. 11 to 17 are views illustrating a printing support system for reducing an environmental load, a printing support program for reducing an environmental load, and a printing support method for reducing an environmental load according to the third embodiment of the invention.

In the present embodiment, the printing support system for reducing an environmental load, the printing support program for reducing an environmental load, and the printing support method for reducing an environmental load according to the invention are applied to a copying machine 100.

First, a functional outline of the copying machine 100 to which the invention is applied will be described.

Figure 11:
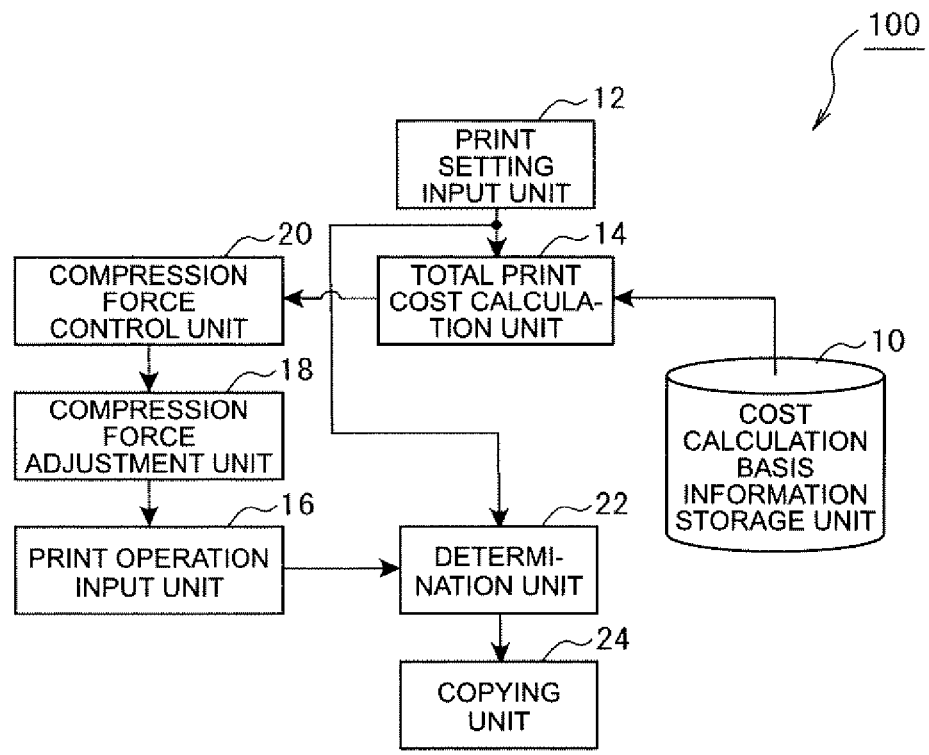
FIG. 11 is a functional block diagram illustrating a functional outline of a copying machine.

FIG. 11 is a functional block diagram illustrating the functional outline of the copying machine 100.

The copying machine 100 includes a cost calculation basis information storage unit 10 that stores cost calculation basis information used to calculate a total print cost, a print setting input unit 12 through which a print request including a print setting is input, and a total print cost calculation unit 14 that calculates the total print cost on the basis of the print setting input by the print setting input unit 12 and the cost calculation basis information stored in the cost calculation basis information storage unit 10.

In addition, the copying machine 100 further includes a print operation input unit 16 through which a print operation for instructing to start printing is input, a compression force adjustment unit 18 that adjusts the compression force at the time of input to the print operation input unit 16, and a compression force control unit 20 that controls the compression force adjustment unit 18 on the basis of the total print cost calculated by the total print cost calculation unit 14. In addition, the copying machine 100 further includes a determination unit 22 that allows printing if it is determined that a print operation through the print operation input unit 16 has been input and a copying unit 24 that performs a copying process when the printing is allowed by the determination unit 22.

Next, the configuration of the copying machine 100 will be described.

Figure 12:
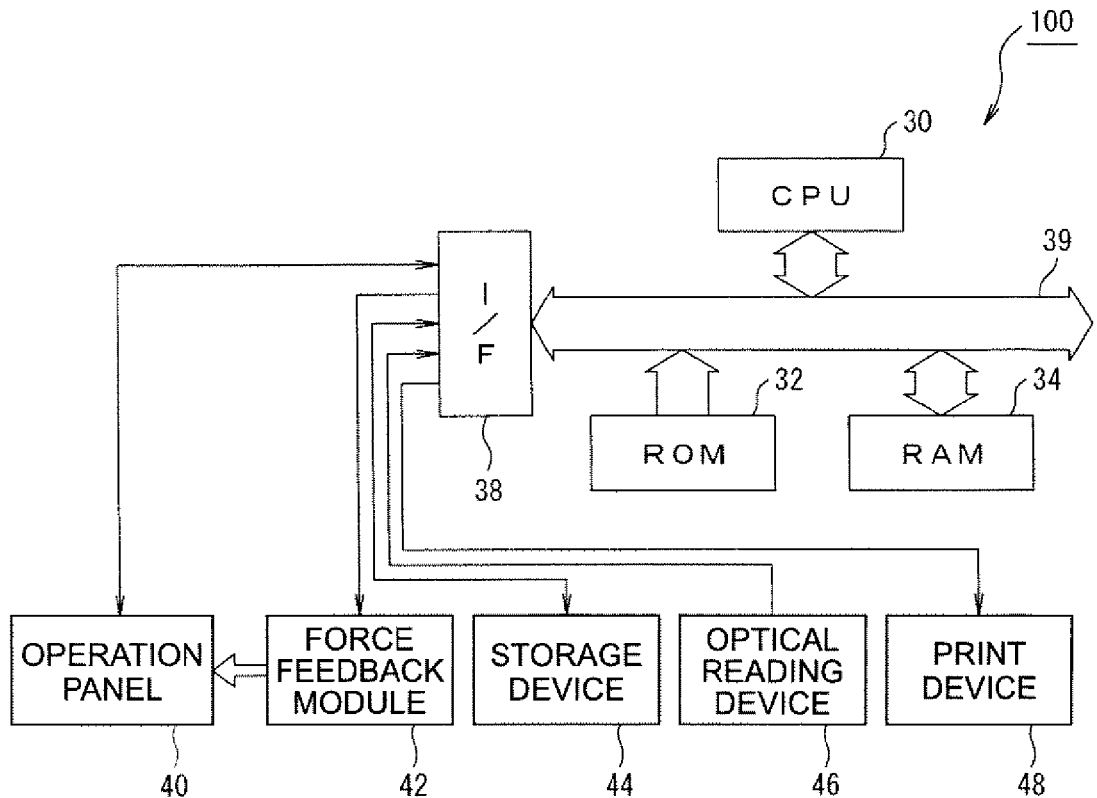
FIG. 12 is a view illustrating the hardware configuration of the copying machine.

FIG. 12 is a block diagram illustrating the hardware configuration of the copying machine 100.

As shown in FIG. 12, the copying machine 100 includes a CPU 30 that controls an overall system and operations on the basis of a control program, a ROM 32 that stores, for example, the control program of the CPU 30 in a predetermined region, a RAM 34 that stores data read from the ROM 32 or an operation result which is needed during an operation process of the CPU 30, and an I/F 38 through which data is input/output with respect to an external device. Data transmission among the CPU 30, the ROM 32, the RAM 34, and the I/F 38 is performed through a bus 39 which is a signal line provided to transmit data.

An operation panel 40, such as a touch panel serving as a human interface unit, through which data can be input and on which the data can be displayed, a force feedback module 42 that adjusts the compression force at the time of input to the operation panel 40, a storage device 44 that stores data, tables, or the like as a file, an optical reading device 46 that optically reads out printing information from a copy source to be printed, and a printing device 48 that has a mechanism necessary for a printing process including a print head, which are all external devices, are connected to the I/F 38. The known technique can be used for the force feedback module 42. For example, the known technique is used in the 'PHANToM' manufactured by Nissho Electronics Co.

Next, the configuration of the operation panel 40 will be described.

Figure 13:
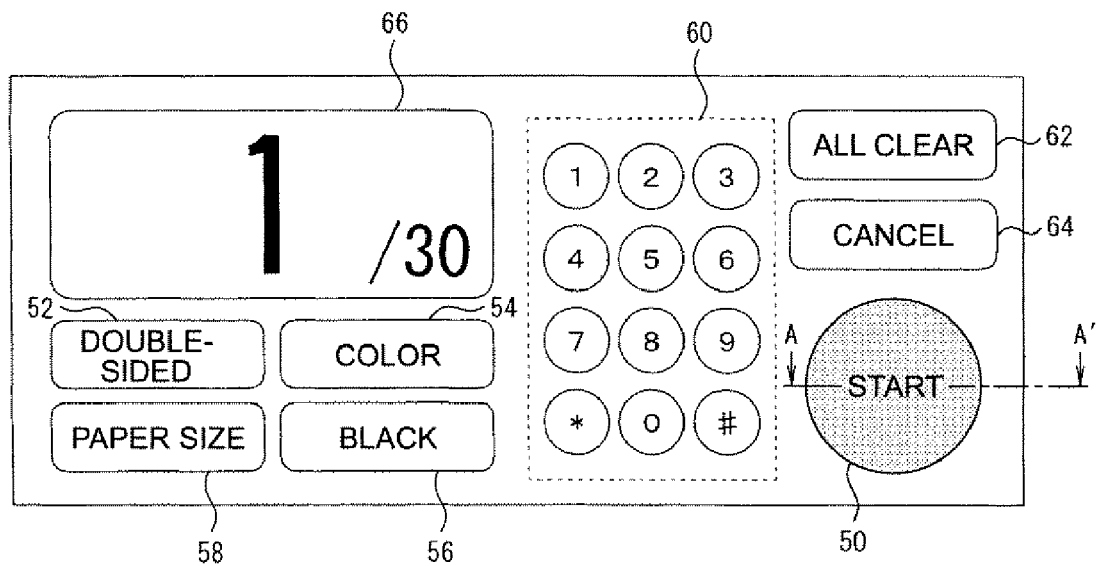
FIG. 13 is a view illustrating the configuration of an operation plane of an operation panel.

FIG. 13 is a view illustrating the configuration of an operation plane of the operation panel 40.

Figure 14:
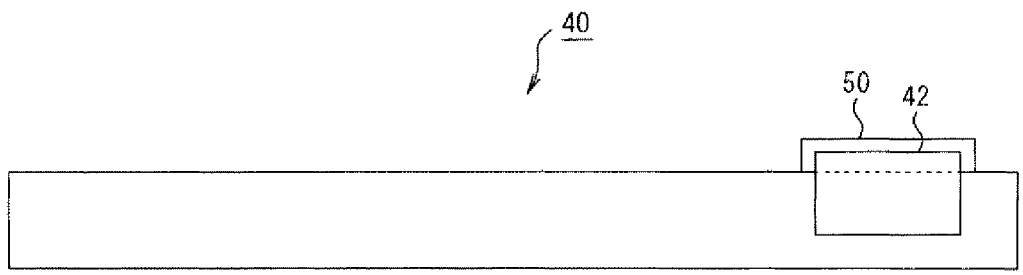
FIG. 14 is a cross-sectional view taken along the line XIV-XIV of FIG. 13.

FIG. 14 is a cross-sectional view taken along the line XIV-XIV of FIG. 13.

As shown in FIG. 13, on the operation plane of the operation panel 40, a start button 50 for instructing to start printing, buttons 52, 54, and 56 for respectively instructing double-sided printing, a color printing, and a black printing, a button 58 for designating the paper size, a tenkey 60 for designating, for example, the number of sheets of paper, an all clear button 62 for initializing a print setting, a cancel button 64 that cancels inputs of various buttons, and a display panel 66 for displaying a current print setting state are provided. Here, the print setting state includes double-sided printing, a color printing, a black printing, the paper size, and the number of sheets of paper.

As shown in FIG. 14, the force feedback module 42 is provided inside the start button 50 so as to generate the compression force at the time of the input to the start button 50. If a predetermined control value is given to the force feedback module 42, the force feedback module 42 generates the compression force according to the control value. Accordingly, if the start button 50 is not pressed with a force stronger than the control value, the print instruction is not valid.

Next, a data structure of the storage device 44 will be described.

The storage device 44 stores a paper cost calculation basis table 420 that is used to calculate the paper cost.

FIG. 15 is a view illustrating the data structure of the paper cost calculation basis table 420.

As shown in FIG. 15, on the paper cost calculation basis table 420, one record is registered for each paper size. Each record includes a field 422 used to register the paper size and a field 424 used to register paper cost necessary for a sheet of paper.

In an example shown in FIG. 15, in the third-column record, 'A3' and '10' are registered as the paper size and the cost, respectively. This represents that, when a printing process is performed by using the A3-sized paper, the paper cost is 10 Yen per paper.

In addition, the storage device 44 stores the print cost calculation basis table 440 used to calculate the print cost.

FIG. 16 is a view illustrating the data structure of the print cost calculation basis table 440.

As shown in FIG. 16, on the print cost calculation basis table 440, one record is registered for each print mode. Each record includes a field 442 used to register the print mode and a field 444 used to register the print cost per single-sided printing according to the print mode.

In an example shown in FIG. 16, in the second-column record, 'A3 color' and '10' are registered as the print mode and the cost, respectively. This represents that, when single-sided printing process is performed in the A3 color mode, the print cost of the copying machine 100 is 10 Yen per printing. In the case of double-sided printing, the print cost is 20 Yen.

Referring back to FIG. 12, the CPU 30 is composed of, for example, a micro processing unit. The CPU 30 runs a predetermined program stored in a predetermined region of the ROM 32 and then executes a copy control process shown in a flow chart of FIG. 17 in accordance with the program.

Figure 17:
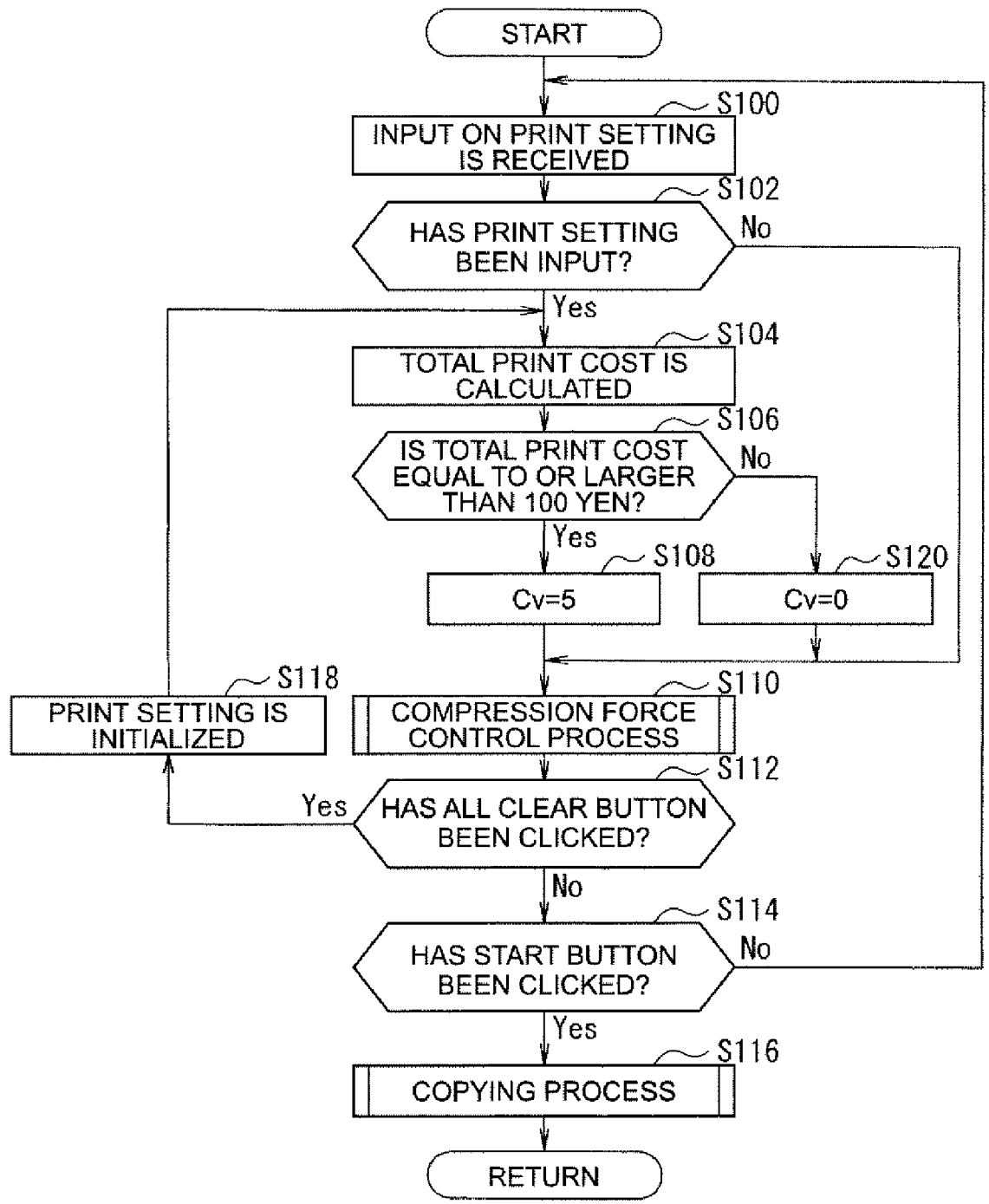
FIG. 17 is a flow chart illustrating a copy control process.

FIG. 17 is a flow chart illustrating a copy control process.

The copy control process is a process that controls the copying machine 100. As shown in FIG. 17, if the CPU 30 executes the copy control process, the process proceeds to step S100.

In step S100, an input on a print setting is received from the operation panel 40, the process proceeds to step S102. In step S102, it is determined whether or not the print setting has been input from the operation panel 40. If it is determined that the print setting has been input from the operation panel 40 (Yes), the process proceeds to step S104.

In step S104, the total print cost is calculated on the basis of the input print setting, the paper cost calculation basis table 420, and a print cost calculation basis table 440. For example, assuming that A4 size, black printing, and 30 copies are set as print setting conditions, a total print cost p can be calculated by the following equation (1) in the case when an equivalent-size and single-sided printing process is performed without page separation.

$$\text{Paper cost } p2 = A4\ (5\text{ Yen}) \times 30\text{ copies} = 150\text{ Yen/sheet of paper}$$

$$\text{Print cost } p3 = A4\text{ black } (1\text{ Yen}) \times 30\text{ (times)} = 30\text{ Yen/sheet of paper}$$

$$\text{Total print cost } p = p2 + p3 = 150 + 30 = 180\text{ Yen/sheet of paper} \quad (1)$$

Further, when double-sided printing process is performed under a condition of two pages on a sheet of paper, the total print cost p can be calculated by the following equation (2). In this case, the number of sheets of paper becomes 30/4+1=8 (corresponding to 8 sheets of paper).

$$\text{Paper cost } p2 = A4\ (5\text{ Yen}) \times 8\text{ copies} = 40\text{ Yen/sheet of paper}$$

$$\text{Print cost } p3 = A4\text{ black } (1\text{ Yen}) \times 15\text{ (times)} = 15\text{ Yen/sheet of paper}$$

$$\text{Total print cost } p = p2 + p3 = 40 + 15 = 55\text{ Yen/sheet of paper} \quad (2)$$

Furthermore, in order to calculate more detailed print cost, a technique disclosed in JP-A-6-227006 can be used, for example.

Subsequently, the process proceeds to step S106. In step S106, it is determined whether or not the calculated total print cost is equal to or larger than a predetermined value (for example, 100 Yen). If it is determined that the total print cost is equal to or larger than the predetermined value (Yes), the process proceeds to step S108. In step S108, a control value Cv of the force feedback module 42 is set to, for example, '5', and then the process proceeds to step S110. In step S110, the force feedback module 42 is controlled such that the compression force corresponding to the set control value Cv is generated, and then the process proceeds to step S112.

In step S112, it is determined whether or not the all clear button 62 has been pressed on the basis of a detection signal output from a switching element (not shown) provided inside the all clear button 62. If it is determined that the all clear button 62 has not been pressed (No), the process proceeds to step S114. On the other hand, if it is determined that the all clear button 62 has been pressed (Yes), the process proceeds to step S118. In step S118, the print setting is initialized, and thus the process returns to step S104.

In step S114, it is determined whether or not the start button 50 has been pressed on the basis of a detection signal output from a switching element (not shown) provided inside the start button 50. If it is determined that the start button 50 has been pressed (Yes), the process proceeds to step S116.

In step S116, the print information obtained from the copy source is read out by means of an optical reading device 46, a copying process in which the printing device 48 performs a printing process on a printing paper on the basis of the read print information, and thus the series of processes described above are completed, returning to an original process.

On the other hand, in step S114, if it is determined that the start button 50 has not been pressed (No), the process proceeds to step S100.

On the other hand, in step S112, if it is determined that the all clear button 62 has been pressed (Yes), the process proceeds to step S118. In step S118, the print setting is initialized, and then the process proceeds to step S104.

On the other hand, in step S106, if it is determined that the total print cost is smaller than the predetermined value (No), the process proceeds to step S120. In step S120, the control value Cv is set to '0', and then the process proceeds to step S110.

Next, an operation of the present embodiment will be described.

A case will be described in which a print setting set by a previous user still exists and a next user performs a copying process, for example, under the condition in which the number of copies to be printed is set to 30.

In the copying machine 100, since 30 copies is set as the print setting condition, the total print cost is calculated on the basis of the print setting and the cost calculation basis tables 420 and 440 in step S104. At this time, if it is determined that the total print cost is equal to or larger than the predetermined value, the control value Cv is set to, for example, '5' in step S108, and the force feedback module 42 is controlled such that the compression force corresponding to the set control value is generated. As a result, a predetermined compression force is applied to the start button 50 by means of the force feedback module 42. For this reason, even though the next user sets the copy source on a tray (not shown) of the copying machine 100 and then presses the start button 50, the copying process does not start if the next user does not press the start button 50 with a force stronger than the compression force generated by the force feedback module 42. Here, if the next user presses the start button 50 with a force stronger than the compression force, the copying process starts in step S116.

Further, the user notices that the copying process does not start even if the start button 50 is pressed, and then the user checks the print setting state on a display panel 66. If the user desires to make a print setting different from a current print setting, the all clear button 62 needs to be pressed. In the copying machine 100, if the all clear button 62 is pressed, the print setting is initialized in step S118.

The user inputs a desired print setting and presses the start button 50. At this time, if it is determined that the total print cost is equal to or larger than a predetermined value, the user needs to press the start button 50 with a force stronger than the compression force generated by the force feedback module 42 in the same processes as described above.

On the other hand, in the copying machine 100, if it is determined that the total print cost is smaller than the predetermined value, the control value Cv is set to '0' in step S120 and the force feedback module 42 is controlled such that the compression force corresponding to the set control value is generated. However, since the control value is set to '0', the compression force is not applied to the start button 50. In this case, the user can start the copying process only by normally pressing the start button 50. In the case when the print cost is small, since the environmental load is small even though the misprint occurs, the convenience of the user has priority.

As such, in the present embodiment, the print request including the print setting is input, and the print cost is calculated on the basis of the input print setting and the cost calculation basis information. Then, if the calculated total print cost is equal to or larger than a predetermined value, the force feedback module 42 is controlled such that the compression force corresponding to the set control value is generated, and when the start button 50 is pressed, the printing is allowed.

Therefore, in the case when data representing the environmental load due to the misprint is large, the copying process does not start if the start button 50 is not pressed by a strong force. Accordingly, it is possible to demand a user to confirm the print setting state. As a result, since it can be expected that the misprint will be reduced, it is possible to reduce the environmental load as compared with a case in the related art.

In the third embodiment described above, the cost calculation basis information corresponds to the environmental load calculation basis information in the first, fourth, or seventh aspect of the invention, the cost calculation basis information storage unit 10 corresponds to the environmental load calculation basis information storage unit in the first, fourth, or seventh aspect of the invention, and the print setting input unit 12, the operation panel 40, and step S100 each correspond to the print setting input unit in the first aspect of the invention. In addition, step S100 corresponds to the print setting input process in the fourth or seventh aspect of the invention, the total print cost calculation unit 14 and step S104 each correspond to the environmental load calculation unit in the first aspect of the invention, and step S104 corresponds to the environmental load calculation process in the fourth or seventh aspect of the invention.

Further, in the third embodiment, the print operation input unit 16 and the operation panel 40 each correspond to the print operation input unit in the first, fourth, or seventh aspect of the invention, the compression force adjustment unit 18 and the force feedback module 42 each correspond to the compression force adjustment unit in the first, second, fourth, fifth, seventh, or eighth aspect of the invention, and the compression force control unit 20 and step S110 each correspond to the compression force control unit in the first or second aspect of the invention. In addition, step S110 corresponds to the compression force control process in the fourth, fifth, seventh, or eighth aspect of the invention, the determination unit 22 and steps S114 each correspond to the determination unit in the first aspect of the invention, and step S144 corresponds to the determination process in the fourth or seventh aspect of the invention.

Furthermore, in the third embodiment, in the case when it is determined the total print cost is equal to or larger than the predetermined value, the force feedback module 42 is controlled such that the predetermined compression force is generated. However, the invention is not limited thereto. For example, the force feedback module 42 may be controlled such that the compression force corresponding to the total print cost is generated. In this case, the control value Cv may be set by the following equation (3):

$$Cv = \text{total print cost } p/20 \qquad (3).$$

Furthermore, in the third embodiment, in the case when the total print cost is equal to or larger than the predetermined value, the control value Cv is set to '5', but the value is only an example and other values may be set according to the necessity. This can also be applied to a configuration in which the control value Cv increases according to the total print cost in a consecutive or stepwise manner.

Furthermore, in the third embodiment, the total print cost is calculated on the basis of the print setting and various cost calculation basis tables 420 and 440. However, the invention is not limited thereto. For example, the total print cost may be calculated on the basis of one of the cost calculation basis tables 420 and 440.

Further, in the third embodiment, the cost calculation basis information storage unit 10 is provided in the copying machine 100. However, the invention is not limited thereto. For example, the cost calculation basis information storage unit 10 may be provided in a terminal other than the copying machine 100.

Furthermore, in the third embodiment, when the process shown in the flow chart of FIG. 17 is performed, the case in which the control program stored beforehand in the ROM 32 is executed has been described. However, the invention is not limited thereto. For example, it is possible to cause the RAM 34 to read out the program, in which the procedures are instructed, from a storage medium on which the program is stored and then to run the program.

Here, the storage medium includes a semiconductor storage medium such as a RAM or a ROM, a magnetic-storage-type storage medium such as a FD or a HD, an optical-reading-type storage medium such as a CD, a CDV, a LD, or a DVD, and a magnetic-storage/optical-reading type storage medium such as a MO. Specifically, the storage medium includes all kinds of storage mediums as long as the storage mediums can be read out by means of a computer, regardless of a reading method, such as the electronic, magnetic, and optical reading methods.

Furthermore, in the third embodiment, the printing support system for reducing an environmental load, the printing support program for reducing an environmental load, and the printing support method for reducing an environmental load according to the invention have been applied to the copying machine 100. However, the invention is not limited thereto. For example, the printing support system for reducing an environmental load, the printing support program for reducing an environmental load, and the printing support method for reducing an environmental load according to the invention may be applied to other devices without departing from the scope of the invention.

For example, instead of the copying machine 100, the printing support system for reducing an environmental load, the printing support program for reducing an environmental load, and the printing support method for reducing an environmental load according to the invention may be applied to a network system in which a host terminal and a network printer are communicatably connected to each other.

In the case when the printing support system for reducing an environmental load, the printing support program for reducing an environmental load, and the printing support method for reducing an environmental load according to the invention is applied to the host terminal, the force feedback module 42 may be provided inside a click button of a mouse or a specific key of a keyboard (for example, a return key).

Fourth Embodiment

Hereinafter, a fourth embodiment of the invention will be described with reference to the accompanying drawings.

FIGS. 18 to 24 are views illustrating a printing support system for reducing an environmental load, a printing support program for reducing an environmental load, and a printing support method for reducing an environmental load according to the first embodiment of the invention. The fourth embodiment will be described with reference to FIGS. 18 to 24 and FIGS. 1 to 5 explained in the first embodiment.

In the present embodiment, the printing support system for reducing an environmental load, the printing support program for reducing an environmental load, and the printing support method for reducing an environmental load according to the invention are applied to a printer driver of a host terminal 100.

First, a functional outline of a network system to which the invention is applied will be described.

FIG. 1 is the functional block diagram illustrating the functional outline of the network system.

As shown in FIG. 1, the host terminal 100 that a user uses and the network printer 200 are connected to the network 199.

The host terminal 100 includes the cost calculation basis information storage unit 10 that stores cost calculation basis information used to calculate a print cost, the print request input unit 12 through which a print request including a print setting is input, and the print cost calculation unit 14 that calculates the print cost on the basis of the print setting input by the print request input unit 12 and the cost calculation basis information stored in the cost calculation basis information storage unit 10.

In addition, the host terminal 100 further includes a print start button display unit 15 that displays a print start button instructing to start printing within a predetermined display region, a position instruction unit 16 that instructs the position on the display region, and a determination unit 18 that allows printing if it is determined that an instruction of the position instruction unit 16 with respect to the display position of the print start button has been made.

The print start button display unit 15 displays the print start button in a first size if it is determined that the print cost calculated by the print cost calculation unit 14 is smaller than a predetermined value, and the print start button display unit 15 displays the print start button in a second size which is smaller than the first size if it is determined that the print cost calculated by the print cost calculation unit 14 is equal to or larger than the predetermined value.

In addition, the host terminal 100 further includes the print data creation unit 20 that creates print data on the basis of document data when the determination unit 18 allows the printing and the print data transmission unit 22 that transmits the print data created by the print data creation unit 20 to the network printer 200.

The network printer 200 includes the print data receiving unit 24 that receives the print data and the printer engine 26 that performs printing on the basis of the print data received by the print data receiving unit 24.

Next, the configuration of the host terminal 100 will be described.

FIG. 2 is the block diagram illustrating the hardware configuration of the host terminal 100.

As shown in FIG. 2, the host terminal 100 includes the CPU 30 that controls an overall system and operations on the basis of the control program, the ROM 32 that stores, for example, the control program of the CPU 30 in a predetermined region, the RAM 34 that stores data read from the ROM 32 or an operation result which is needed during an operation process of the CPU 30, and an I/F 38 through which data is input/output with respect to an external device. Data transmission among the CPU 30, the ROM 32, the RAM 34, and the I/F 38 is performed through the bus 39 which is a signal line provided to transmit data.

The input device 40, such as a keyboard or a mouse serving as a human interface unit, through which data can be input, the storage device 42 that stores data, tables, or the like as a file, the display device 44 that displays a screen on the basis of an image signal, and the signal line for connection with the network 199, which are all external devices, are connected to the I/F 38.

Next, a data structure of the storage device 42 will be described.

The storage device 42 stores the ink cost calculation basis table 400 that is used to calculate the ink cost.

FIG. 3 is the view illustrating the data structure of the ink cost calculation basis table 400.

As shown in FIG. 3, on the ink cost calculation basis table 400, one record is registered for each ink color. Each record includes the field 402 used to register an ink color and the field 404 used to register ink cost necessary for forming one dot.

In an example shown in FIG. 3, in the third-column record, 'black (K)' and '0.000001' are registered as the ink color and the cost, respectively. This represents that, when a printing process is performed by using the black ink, the ink cost is 0.000001 Yen per dot.

In addition, the storage device 42 stores the paper cost calculation basis table 420 that is used to calculate the paper cost.

FIG. 4 is the view illustrating the data structure of the paper cost calculation basis table 420.

As shown in FIG. 4, on the paper cost calculation basis table 420, one record is registered for each size of printing paper. Each record includes the field 422 used to register the size of printing paper and the field 424 used to register ink cost per printing paper.

In an example shown in FIG. 4, in the third-column record, 'A3' and '10' are registered as the paper size and the cost, respectively. This represents that, when a printing process is performed by using an A3-sized printing paper, the paper cost is 10 Yen per printing paper.

In addition, the storage device 42 stores the depreciation cost calculation basis table 440 that is used to calculate the depreciation cost.

FIG. 5 is the view illustrating the data structure of the depreciation cost calculation basis table 440.

As shown in FIG. 5, on the depreciation cost calculation basis table 440, one record is registered for each print mode. Each record includes the field 442 used to register the print mode and the field 444 used to register the depreciation cost per single-sided printing according to the print mode.

In an example shown in FIG. 5, in the second-column record, 'A3 color' and '1' are registered as the print mode and the cost, respectively. This represents that, when single-sided printing process is performed in the A3 color mode, the depreciation cost is 1 Yen per printing. In the case of double-sided printing, the depreciation cost is 2 Yen.

Referring back to FIG. 2, the CPU 30 is composed of, for example, a micro processing unit. The CPU 30 runs a predetermined program stored in a predetermined region of the ROM 32 and then executes a print request process shown in the flow chart of FIG. 6 in accordance with the program.

Figure 18:
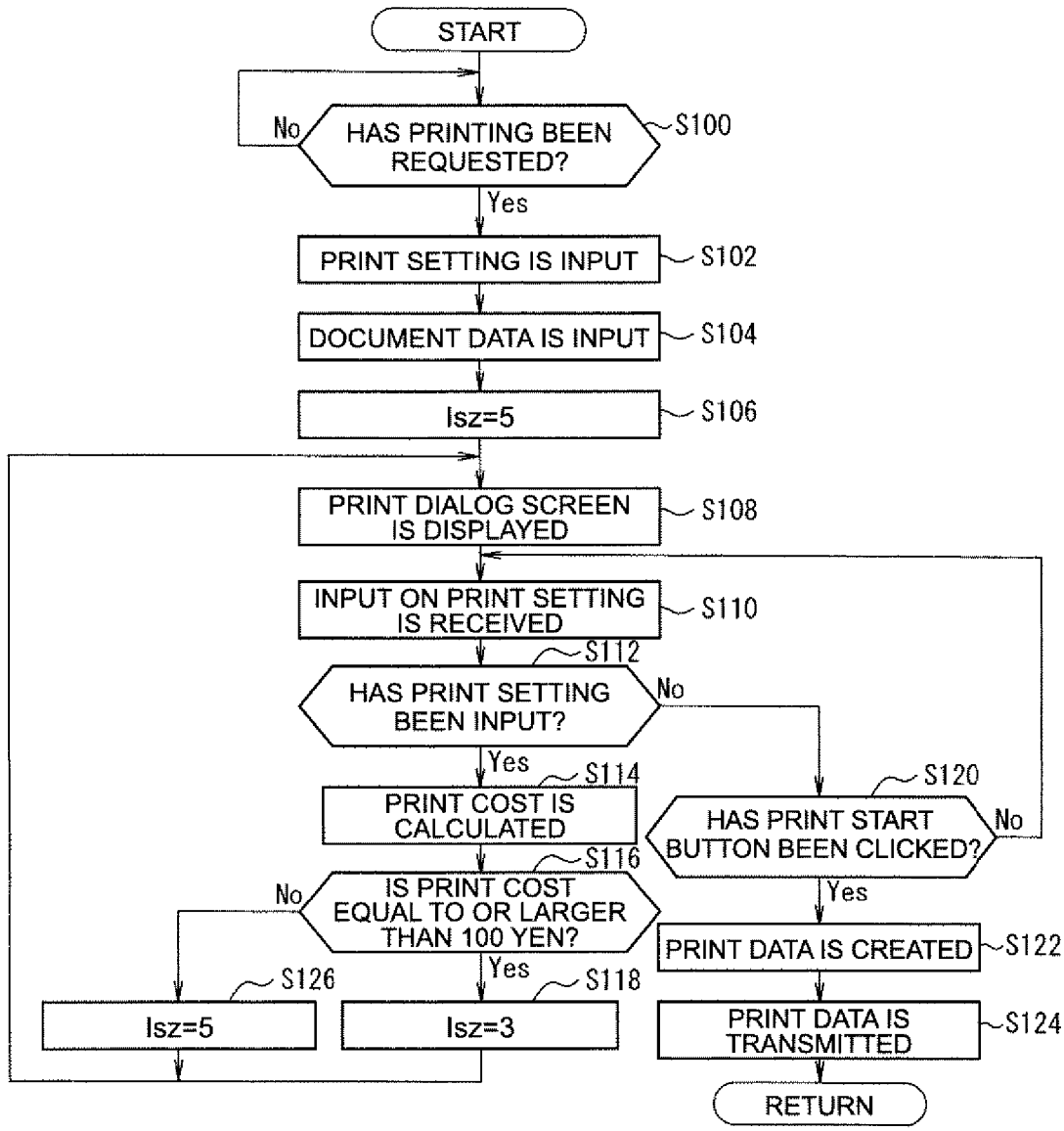
FIG. 18 is a flow chart illustrating a print request process.

FIG. 18 is a flow chart illustrating a print request process.

The print request process is a process that requests the network printer 200 to perform a printing. As shown in FIG. 18, if the CPU 30 executes the print request process, the process proceeds to step S100.

In step S100, it is determined whether or not a printing has been requested from a document creation application or the like. Then, if it is determined that the printing has been requested (Yes), the process proceeds to step S102, but it is determined that the printing has not been requested (No), the process waits in step S100 until a printing is requested.

In step S102, a print setting, such as multi-pages on a sheet of paper, double-sided printing, or the number of pages, is input from the document creation application or the like, and then the process proceeds to step S104. In step S104, document data is input from the document creation application or the like, and then the process proceeds to step S106. In step S106, a variable lsz for storing the size of the print start button is set to, for example, '5', and then the process proceeds to step S108.

In step S108, a print dialog screen is displayed on the display device 44. At this time, on the print dialog screen, the print start button is displayed in a size corresponding to a value of the variable lsz. Here, the size of the print start button becomes smaller as the value of the variable lsz is smaller.

Subsequently, the process proceeds to step S110. In step S110, a print setting, such as the number of copies to be printed, is input by an instruction of a mouse that is the input device 40, and then the process proceeds to step S112. In step S112, it is determined whether or not the print setting has been input. If it is determined that the print setting has been input (Yes), the process proceeds to step S114.

In step S114, a print cost is calculated on the basis of the input print setting and document data, the ink cost calculation basis table 400, the paper cost calculation basis table 420, and the depreciation cost calculation basis table 440. For example, when a black document is printed out under the condition in which the size is A4, the number of pages is 30, and the average dot number per page is 140000 dots, a print cost p can be calculated by the following equation (1) in the case when an equivalent-size and single-sided printing process is performed without page separation.

$$\text{Ink cost } p1 = \text{black } (0.000001 \text{ Yen}) \times 140000 \times 30 = 4.2 \text{ Yen}$$

$$\text{Paper cost } p2 = A4 \text{ (5 Yen)} \times 30 \text{ sheets of paper} \times 1 \text{ copy} = 150 \text{ Yen}$$

$$\text{Depreciation cost } p3 = A4 \text{ black } (0.1 \text{ Yen}) \times 30 \text{ (times)} = 3 \text{ Yen}$$

$$\text{Print cost } p = p1 + p2 + p3 = 4.2 + 150 + 3 = 157.2 \text{ Yen} \tag{1}$$

Further, when double-sided printing process is performed under a condition of two pages on a sheet of paper, the print cost can be calculated by the following equation (2). In this case, the number of dots becomes 0.7 times due to the reduction of A4→A5 and the number of sheets of paper becomes 30/4+1=8.

$$\text{Ink cost } p1 = \text{black } (0.000001 \text{ Yen}) \times 140000 \times 0.7 \times 30 = 0.3 \text{ Yen}$$

$$\text{Paper cost } p2 = A4 \text{ (5 Yen)} \times 8 \text{ sheets of paper} \times 1 \text{ copy} = 40 \text{ Yen}$$

$$\text{Depreciation cost } p3 = A4 \text{ black } (0.1 \text{ Yen}) \times 15 \text{ (times)} = 1.5 \text{ Yen}$$

$$\text{Print cost } p = p1 + p2 + p3 = 0.3 + 40 + 1.5 = 41.8 \text{ Yen} \tag{2}$$

Furthermore, in order to calculate even more detailed print cost, the technique disclosed in JP-A-6-227006 can be used, for example.

Subsequently, the process proceeds to step S116. In step S116, it is determined whether or not the calculated print cost is equal to or larger than a predetermined value (for example, 100 Yen). If it is determined that the print cost is equal to or larger than the predetermined value (Yes), the process proceeds to step S118. In step S118, a variable lsz is set to, for example, '3' which is smaller than the value set in step S106, and then the process proceeds to step S108.

In step S112, if it is determined that the print setting has not been input (No), the process proceeds to step S120. In step S120, it is determined whether or not the instruction of the mouse with respect to the display position of the print start button has been performed, and if it is determined that the instruction of the mouse has been performed, the process proceeds to step S122.

In step S122, the print data is created on the basis of input document data, and the process proceeds to step S124. In step S124, the created print data is transmitted to the network printer 200, and thus the series of processes described above are completed, returning to an original process.

On the other hand, in step S120, if it is determined that the mouse instruction is not performed (No), the process proceeds to step S110.

On the other hand, in step S116, if it is determined that the print cost is smaller than the predetermined value (No), the process proceeds to step S126. In step S126, the variable lsz is set to '5' that is equal to the value set in step S106, and then the process proceeds to step S108.

Next, an operation of the present embodiment will be described.

A user requests a printing through a document creation application in the host terminal 100.

In the host terminal 100, if the printing is requested, the print setting and the document data are input, the variable lsz is set to '5', and a print dialog screen is displayed through steps S102, S104, S106, and S108.

Figure 19:
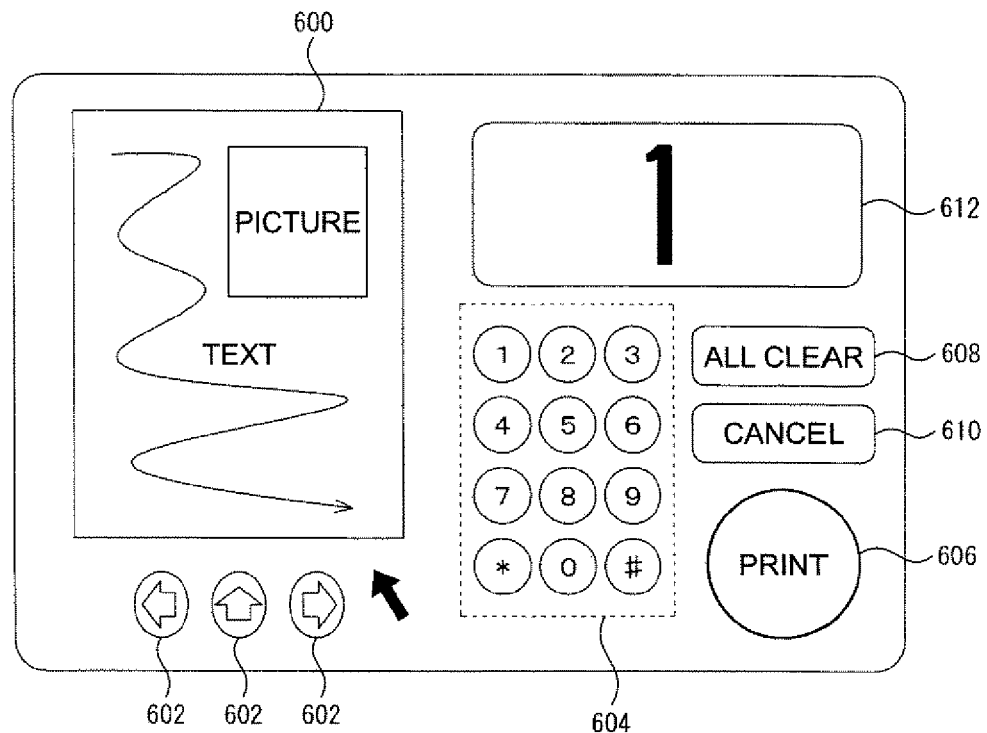
FIG. 19 is a view illustrating a print dialog screen.

FIG. 19 is a view illustrating a print dialog screen.

As shown in FIG. 19, a preview region 600 for displaying a preview of a print result, a control button 602 for changing the preview region 600, a tenkey button 604 for designating the number of sheets of paper, a print start button 606, an all clear button 608 for initializing a print setting, a cancel button 610 for canceling the inputs of various buttons, and a print setting display region 612 for displaying a current print setting state are provided. The print start button 606 is display in a standard size because the value of the variable lsz is the default value '5'.

Next, the user clicks the tenkey button 604 on the print dialog screen by using the mouse and sets '5' as the number of copies to be printed.

In the host terminal 100, if the number of copies to be printed is input as the print setting, the print cost is calculated on the basis of the print setting and the document data input in step S114 and the cost calculation basis tables 400, 420, and 440. At this time, since the number of copies to be printed is '5', if it is determined that the print cost is equal to or larger than the predetermined value, the variable lsz is set to '3' and the print dialog screen is displayed through steps S116 and 108.

Figure 20:
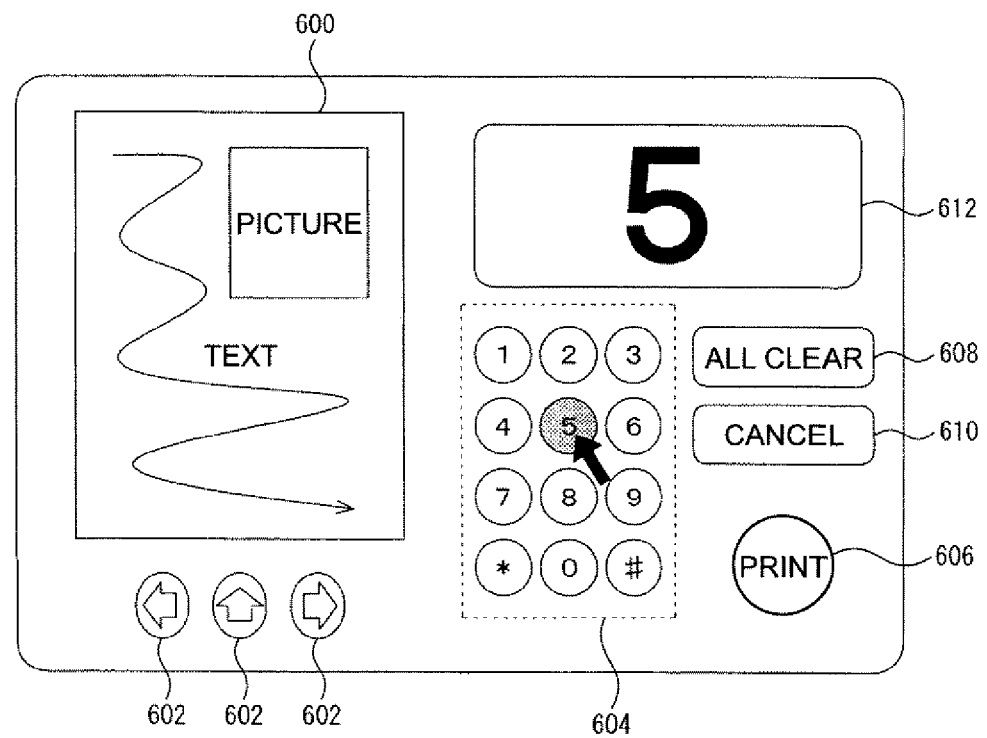
FIG. 20 is a view illustrating a print dialog screen.

FIG. 20 is a view illustrating a print dialog screen.

As shown in FIG. 20, on the print dialog screen, the print start button 606 is displayed in a size smaller than the standard size because the value of the variable lsz is '3' that is smaller than the default value. For this reason, by consecutive input operations such as consecutive clicking operations, there is a possibility that the print start button 606 will not be definitely instructed. As a result, the printing process may not be started. In this case, the user should definitely check the display position of the print start button 606 so as to instruct the printing.

When the user clicks the print start button 606, the print data is created and the created print data is transmitted to the network printer 200 through steps S122 and S124.

In the network printer 200, when the print data is received by the print data receiving unit 24, the printing process starts by the printer engine 26 on the basis of the received print data.

Further, the user notices that the printing process does not start even if the print start button 606 is clicked, and then the user checks the print setting state. If there is a setting error, the user changes the print setting state. For example, in the case in which the user intends to print one copy but 5 copies are set as a default, the user changes the number of copies to be printed to one copy.

In the host terminal 100, if the print setting is input, the print cost is calculated and the variable lsz is set in step S114. Thereafter, in the same procedures as described above, the print operation is started.

In addition, in the host terminal 100, if it is determined that the print cost is smaller than the predetermined value, the variable lsz is set to '5' in step S126. In this case, since the print start button 606 is displayed in the standard size, it is possible for the user to start the printing process by normally clicking the print start button 606. In the case when the print cost is small, since the environmental load is small even though misprint occurs, the convenience of the user has priority.

As such, in the present embodiment, the print setting is input, the print cost is calculated on the basis of the input print setting and the cost calculation basis information. Then, in the case when it is determined that the calculated print cost is equal to or larger than the predetermined value, the print start button 606 is display in the size smaller than the standard size, and in the case when it is determined that an instruction of the mouse with respect to the display position of the print start button 606 has been made, the printing is allowed.

Therefore, in the case when the data representing the environmental load due to the misprint is large, the mouse instruction should be made after checking the display position of the print start button 606. Accordingly, it is possible to demand a user to confirm the print setting state. As a result, since it can be expected that the misprint will be reduced, it is possible to reduce the environmental load as compared with a case in the related art.

In the fourth embodiment described above, the cost calculation basis information storage unit 10 corresponds to the environmental load calculation basis information storage unit in the first, ninth, or seventeenth aspect of the invention, the print setting input unit 12, the input device 40, and steps S102 and S110 each correspond to the print setting input unit in the first aspect of the invention, and steps S102 and S110 each correspond to the print setting input process in the ninth or seventeenth aspect of the invention. In addition, the print cost calculation unit 14 and step S114 each correspond to the environmental load calculation unit in the first aspect of the invention, step S114 corresponds to the environmental load calculation process in the ninth or seventeenth aspect of the invention, and the print start button display unit 15 and step S108 each correspond to the start instruction image display unit in the first or second aspect of the invention.

Further, in the fourth embodiment described above, step S108 corresponds to the start instruction image display process in the ninth, tenth, seventeenth, or eighteenth aspect of the invention, the position instruction unit 16 and the input device 40 each correspond to the position instruction unit in the first, ninth, or seventeenth aspect of the invention, and the determination unit 18 and step S120 each correspond to the determination process in the first aspect of the invention. In addition, step S120 corresponds to the determination process in the ninth or seventeenth aspect of the invention, the cost calculation basis information corresponds to the environmental load calculation basis information in the first, ninth, or seventeenth aspect of the invention, and the print start button 606 corresponds to the start instruction image in the first, second, ninth, tenth, seventeenth, or eighteenth aspect of the invention.

Furthermore, in the fourth embodiment, if it is determined that the print cost is equal to or larger than the predetermined value, the print start button 606 is displayed in the size smaller than the standard size. However, the invention is not limited thereto. For example, when it is determined that the print cost is equal to or larger than the predetermined value, the print start button 606 may be displayed with a color having concentration that causes the contrast to be lower than the case of standard concentration.

In the host terminal 100, when the print process is requested, the print setting the document data are input, the variable lsz is set to '5', and the print dialog screen is displayed through steps S102, S104, S106, and S108.

Figure 21:
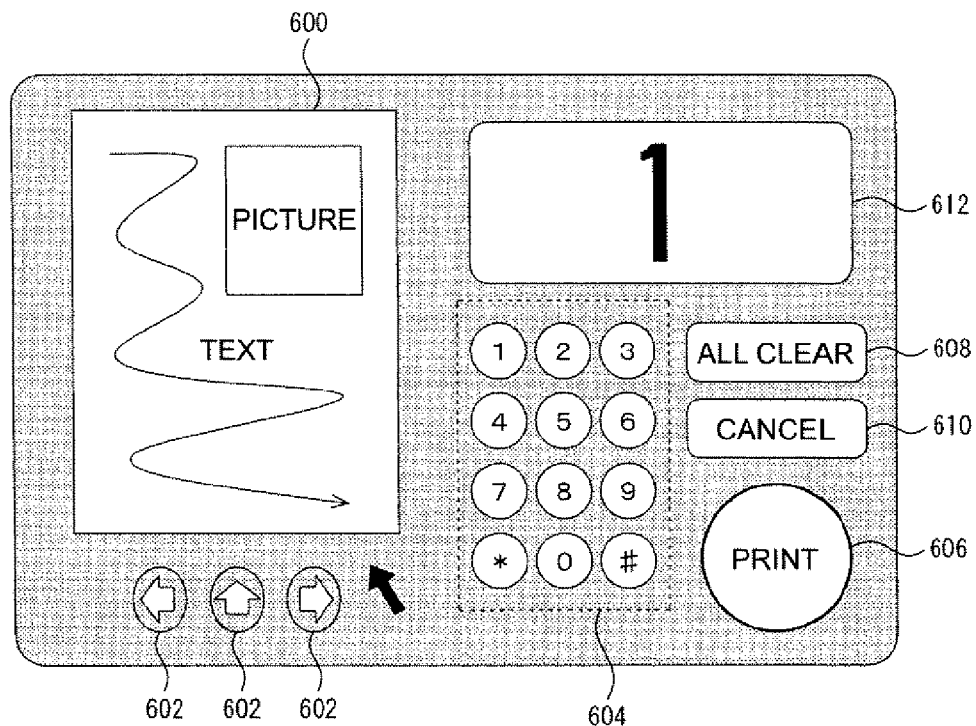
FIG. 21 is a flow chart illustrating a print request process.

FIG. 21 is a view illustrating a print dialog screen.

As shown in FIG. 21, on the print dialog screen, the print start button 606 is displayed with a color having standard concentration because the value of the variable lsz is the default value '5'.

Then, the user clicks the tenkey button 604 on the print dialog screen by using a mouse and sets the number of copies to be printed to, for example, '5'.

In the host terminal 100, if the number of copies to be printed is input as the print setting condition, the print cost is calculated on the basis of the print setting and the document data input in step S114 and the cost calculation basis tables 400, 420, and 440. At this time, since the number of copies to be printed is '5', if it is determined that the print cost is equal to or larger than the predetermined value, the variable lsz is set to '3' and the print dialog screen is displayed through steps S116 and S108.

Figure 22:
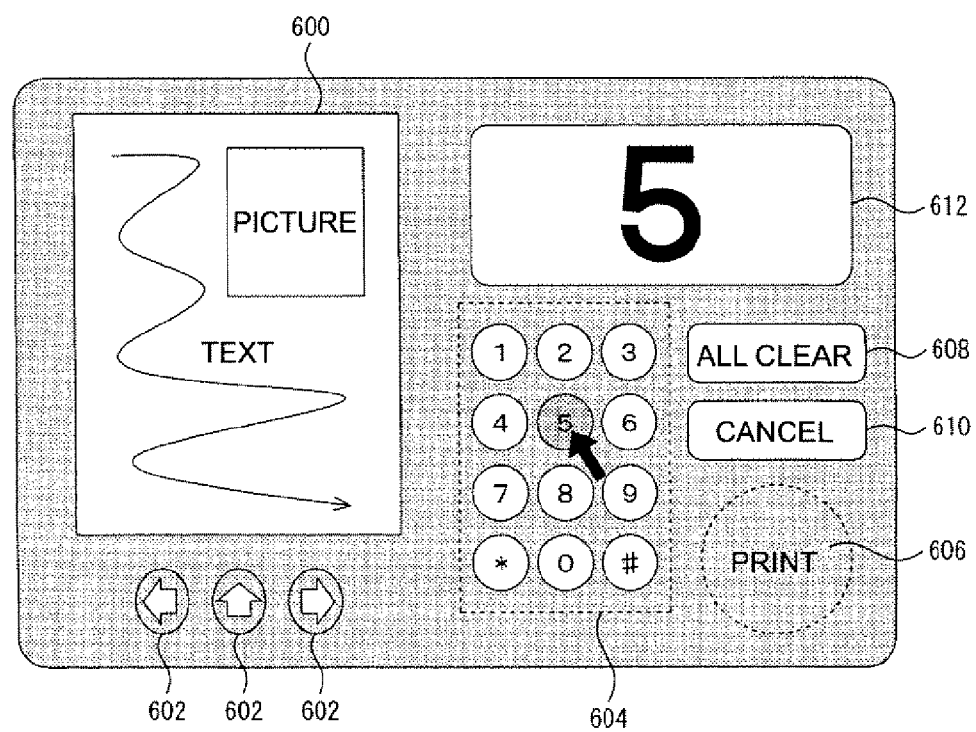
FIG. 22 is a view illustrating a print dialog screen.

FIG. 22 is a view illustrating a print dialog screen.

As shown in FIG. 22, on the print dialog screen, the print start button 606 is displayed with a color having concentration that causes the contrast to be lower than in the case of standard concentration because the value of the variable lsz is '3' that is smaller than the default value. For this reason, by consecutive input operations such as consecutive clicking operations, there is a possibility that the print start button 606 will not be definitely instructed. As a result, the printing process may not be started. In this case, the user should definitely check the display position of the print start button 606 so as to instruct the printing.

As such, the same effects as in the present embodiment can be obtained.

In addition, the print start button 606 may be displayed at a position different from a standard position when it is determined that the print cost is equal to or larger than the predetermined value.

In the host terminal 100, when the print process is requested, the print setting the document data are input, the variable lsz is set to '5', and the print dialog screen is displayed through steps S102, S104, S106, and S108.

Figure 23:
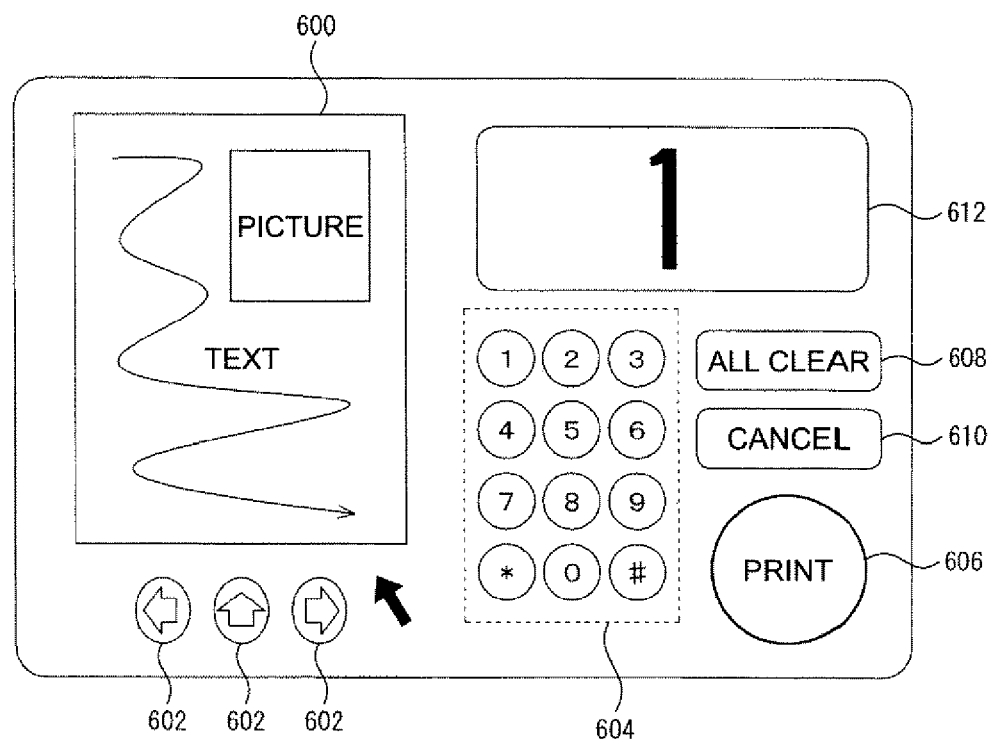
FIG. 23 is a view illustrating a print dialog screen.

FIG. 23 is a view illustrating a print dialog screen.

As shown in FIG. 23, on the print dialog screen, the print start button 606 is displayed at the standard position because the value of the variable lsz is the default value '5'.

Then, the user clicks the tenkey button 604 on the print dialog screen by using a mouse and sets the number of copies to be printed to, for example, '5'.

In the host terminal 100, if the number of copies to be printed is input as the print setting condition, the print cost is calculated on the basis of the print setting and the document data input in step S114 and the cost calculation basis tables 400, 420, and 440. At this time, since the number of copies to be printed is '5', if it is determined that the print cost is equal to or larger than the predetermined value, the variable lsz is set to '3' and the print dialog screen is displayed through steps S116 and S108.

Figure 24:
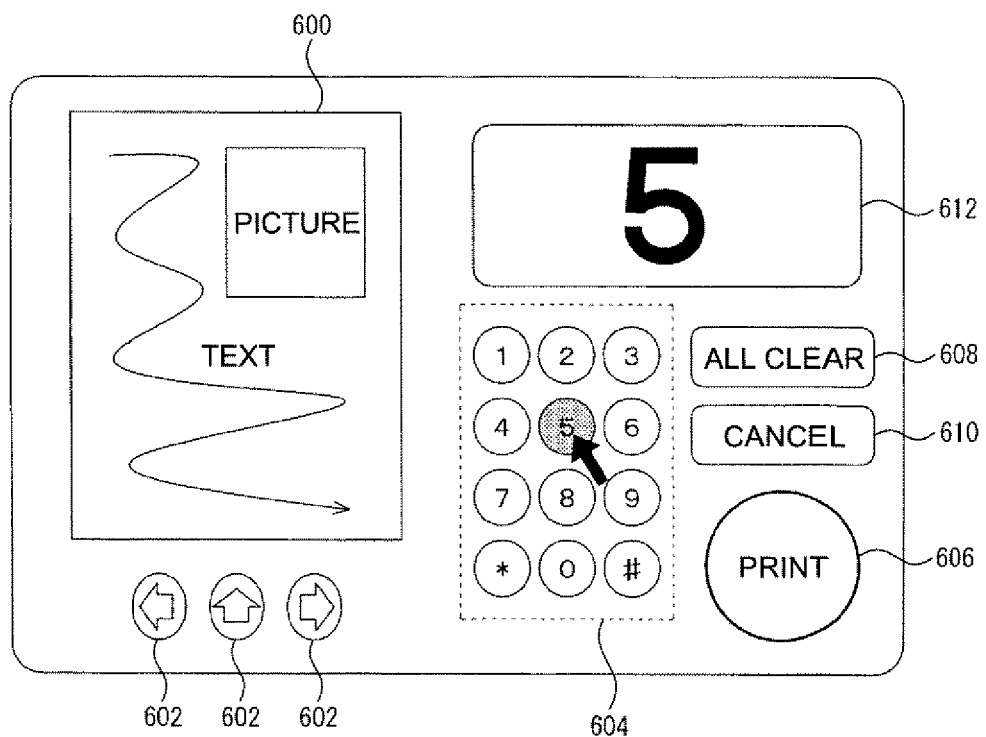
FIG. 24 is a flow chart illustrating a print request process.

FIG. 24 is a view illustrating a print dialog screen.

As shown in FIG. 24, on the print dialog screen, the print start button 606 is displayed at the position different from the standard position because the value of the variable lsz is '3' that is smaller than the default value. The print start button 606 is replaced with the cancel button 610 or the cancel button 610 is replaced with the print start button 606. For this reason, by consecutive input operations such as consecutive clicking operations, there is a possibility that the print start button 606 will not be definitely instructed. As a result, the printing process may not be started. In this case, the user should definitely check the display position of the print start button 606 so as to instruct the printing.

As such, the same effects as in the present embodiment can be obtained.

Further, in the fourth embodiment, the print start button 606 is displayed in the size smaller than the standard size when it is determined that the print cost is equal to or larger than the predetermined value. However, the invention is not limited thereto. For example, the print start button 606 may be displayed such that the size of the print start button 606 becomes small as the print cost increases. In this case, the variable lsz can be calculated by the following equation (3), for example. In addition, this configuration can also be applied to a configuration in which the concentration of the print start button 606 is changed.

$$lsz = \text{print cost } p/20 \qquad (3)$$

Furthermore, in the fourth embodiment, the print data is created after the printing is allowed. However, the invention is not limited thereto. For example, in the fourth embodiment, the print data may be created through steps S102 to S120.

Furthermore, in the fourth embodiment, in the case when the print cost is equal to or larger than the predetermined value, the variable lsz is set to '3', but the value is only an example and other values may be set according to the necessity. This can also be applied to a configuration in which the variable lsz increases according to the print cost in a consecutive or stepwise manner.

Furthermore, in the fourth embodiment, the print cost is calculated on the basis of the print setting, the document data, and various cost calculation basis tables 400, 420, and 440. However, the invention is not limited thereto. For example, the print cost may be calculated on the basis of one of the cost calculation basis tables 400, 420, and 440. In addition, when the depreciation cost calculation basis table 440 is not used, the document data is not needed.

Further, in the fourth embodiment, the cost calculation basis information storage unit 10 is provided in the host terminal 100. However, the invention is not limited thereto. For example, the cost calculation basis information storage unit 10 may be provided in a terminal other than the host terminal 100 and the network printer 200.

Furthermore, in the fourth embodiment, when the process shown in the flow chart of FIG. 6 is performed, the case in which the control program stored beforehand in the ROM 32 is executed has been described. However, the invention is not limited thereto. For example, it is possible to cause the RAM 34 to read out the program, in which the procedures are instructed, from a storage medium on which the program is stored and then to run the program.

Here, the storage medium includes a semiconductor storage medium such as a RAM or a ROM, a magnetic-storage-type storage medium such as a FD or a HD, an optical-reading-type storage medium such as a CD, a CDV, a LD, or a DVD, and a magnetic-storage/optical-reading type storage medium such as a MO. Specifically, the storage medium includes all kinds of storage mediums as long as the storage mediums can be read out by means of a computer, regardless of a reading method, such as the electronic, magnetic, and optical reading methods.

Furthermore, in the fourth embodiment, the printing support system for reducing an environmental load, the printing support program for reducing an environmental load, and the printing support method for reducing an environmental load according to the invention have been applied to the printer driver of the host terminal 100. However, the invention is not limited thereto. For example, the printing support system for reducing an environmental load, the printing support program for reducing an environmental load, and the printing support method for reducing an environmental load according to the invention may be applied to other devices without departing from the scope of the invention.

This application claims priority to Japanese Patent Application Nos. 2005-139316 filed May 12, 2005, 2005-162479 filed Jun. 2, 2005, 2006-066586 filed Mar. 10, 2006 and 2006-066586 filed Mar. 10, 2006 which are hereby expressly incorporated by reference herein in their entirety.

What is claimed is:

1. A printing support system for reducing an environmental load that changes an input load of a print operation depending on data representing the environmental load, comprising:
    an environmental load calculation basis information storage unit that stores environmental load calculation basis information used to calculate the data representing the environmental load;
    a print request input unit through which a print request including a print setting is input;
    an environmental load calculation unit that calculates the data representing the environmental load on the basis of the print request input by the print request input unit and the environmental load calculation basis information stored in the environmental load calculation basis information storage unit;
    a print operation input unit through which a print operation for instructing to start printing is input;
    a determination unit that, when it is determined that the print operation through the print operation input unit has been input more than a predetermined condition on the basis of the data representing the environmental load calculated by the environmental load calculation unit, allows printing according to the print request input by the print request input unit,
    wherein the predetermined condition is a compression force;
    a compression force adjustment unit that adjusts the compression force at the time of input to the print operation input unit; and
    a compression force control unit that controls the compression force adjustment unit on the basis of the data representing the environmental load calculated by the environmental load calculation unit.

2. The printing support system for reducing the environmental load according to claim 1,
    wherein the predetermined condition is a predetermined period of time.

3. The printing support system for reducing the environmental load according to claim 2,
    wherein, when the data representing the environmental load is equal to or larger than a predetermined value, the determination unit allows the printing according to the print request if it is determined that the print operation has been input consecutively and continuously for more than the predetermined period of time.

4. The printing support system for reducing the environmental load according to claim 2,
    wherein the determination unit allows the printing according to the print request when it is determined that the print operation has been input consecutively and continuously more than a period of time corresponding to the data representing the environmental load.

5. The printing support system for reducing the environmental load according to claim 2,
    wherein the environmental load calculation basis information is a paper cost, an ink cost, a depreciation cost, or a toner cost.

6. The printing support system for reducing the environmental load according to claim 1,
    wherein the predetermined condition is the predetermined number of times.

7. The printing support system for reducing the environmental load according to claim 6,
    wherein, when the data representing the environmental load is equal to or larger than a predetermined value, the determination unit allows the printing according to the print request if it is determined that the print operation has been input more than the predetermined number of times.

8. The printing support system for reducing the environmental load according to claim 6,
    wherein the determination unit allows the printing according to the print request when it is determined that the print operation has been input more than the number of times corresponding to the data representing the environmental load.

9. The printing support system for reducing the environmental load according to claim 6,
    wherein the environmental load calculation basis information is a paper cost, an ink cost, a depreciation cost, or a toner cost.

10. The printing support system for reducing the environmental load according to claim 1,
    wherein the compression force control unit controls the compression force adjustment unit such that a predetermined compression force is generated when it is determined that the data representing the environmental load is equal to or larger than a predetermined value.

11. The printing support system for reducing the environmental load according to claim 1,
    wherein the compression force control unit controls the compression force adjustment unit such that a compression force corresponding to the data representing the environmental load is generated.

12. The printing support system for reducing the environmental load according to claim 1, further comprising:
- a start instruction image display unit that displays a start instruction image for instructing to start printing within a predetermined display region; and
- a position instruction unit that instructs the position on the display region,
- wherein the determination unit allows painting if it is determined that an instruction of the position instruction unit with respect to a display position of the start instruction image has been made, and
- the start instruction image display unit changes the size of the start instruction image on the basis of the data representing the environmental load calculated by the environmental load calculation unit.

13. The printing support system for reducing the environmental load according to claim 12,
- wherein the start instruction image display unit displays the start instruction image in a first size when it is determined that the data representing the environmental load is smaller than a predetermined value, and
- the start instruction image display unit displays the start instruction image in a second size smaller than the first size when it is determined that the data representing the environmental load is equal to or larger than the predetermined value.

14. The printing support system for reducing the environmental load according to claim 12,
- wherein the start instruction image display unit displays the start instruction image such that the size of the start instruction image becomes small as the data representing the environmental load increases.

15. A printing support method for reducing an environmental load that changes an input load of a print operation depending on data representing the environmental load, comprising:
- inputting a print request including a print setting;
- calculating the environmental load by calculating the data representing the environmental load on the basis of the print request made in the inputting of the print request and environmental load calculation basis information stored in an environmental load calculation basis information storage unit used to calculate the data representing the environmental load;
- inputting a print operation for instructing to start printing;
- determining that printing according to the print request made in the inputting of the print request is allowed, when it is determined that the print operation performed in the inputting of the print operation has been input more than a predetermined condition on the basis of the data representing the environmental load obtained in the calculating of the environmental load,
- wherein the predetermined condition is a compression force;
- adjusting the compression force at the time of the inputting of the print operation; and
- controlling the adjusting on the basis of the data representing the environmental load.

16. The printing support method for reducing the environmental load according to claim 15,
- wherein the predetermined condition is a predetermined period of time.

17. The printing support method for reducing the environmental load according to claim 15,
- wherein the predetermined condition is the predetermined number of times.

18. A printing support method for reducing an environmental load that changes an input load of a print operation depending on data representing the environmental load, comprising:
- inputting a print setting;
- calculating the environmental load by calculating the data representing the environmental load on the basis of the print setting made in the inputting of the print setting and environmental load calculation basis information stored in an environmental load calculation basis information storage unit used to calculate the data representing the environmental load;
- inputting a print operation for instructing to start printing through a print operation input unit;
- controlling a compression force by controlling a compression force adjustment unit that adjusts the compression force at the time of input to the print operation input unit on the basis of the data representing the environmental load obtained in the calculating of the environmental load; and
- determining that printing is allowed when it is determined that the paint operation performed in the inputting of the print operation has been input.

19. A printing support system for reducing an environmental load that changes an input load of a print operation depending on data representing the environmental load, comprising:
- an environmental load calculation basis information storage unit that stores environmental load calculation basis information used to calculate the data representing the environmental load;
- a print setting input unit through which a print setting is input;
- an environmental load calculation unit that calculates the data representing the environmental load on the basis of the print setting input by the print setting input unit and the environmental load calculation basis information stored in the environmental load calculation basis information storage unit;
- a start instruction image display unit that displays a start instruction image for instructing to start printing within a predetermined display region;
- a position instruction unit that instructs the position on the display region;
- a determination unit that allows printing if it is determined that an instruction of the position instruction unit with respect to a display position of the start instruction image has been made,
- wherein the start instruction image display unit changes the concentration of a color of the start instruction image on the basis of the data representing the environmental load calculated by the environmental load calculation unit;
- a print operation input unit through which a print operation for instructing to start printing is input;
- a compression force adjustment unit that adjusts a compression force at the time of input to the print operation input unit; and
- a compression force control unit that controls the compression force adjustment unit on the basis of the data representing the environmental load calculated by the environmental load calculation unit.

20. The printing support system for reducing the environmental load according to claim 19,
- wherein the start instruction image display unit displays the start instruction image by a first concentration when it is determined that the data representing the environmental load is smaller than a predetermined value, and
- the start instruction image display unit displays the start instruction image by a second concentration causing the contrast to be lower than the case of the first concentration when it is determined that the data representing the environmental load is equal to or larger than the predetermined value.

21. The printing support system for reducing the environmental load according to claim 19, wherein the start instruction image display unit displays the start instruction image such that the concentration of the start instruction image becomes low as the data representing the environmental load increases.

22. A printing support system for reducing an environmental load that changes an input load of a print operation depending on data representing the environmental load, comprising:

an environmental load calculation basis information storage unit that stores environmental load calculation basis information used to calculate the data representing the environmental load;

a print setting input unit through which a print setting is input;

an environmental load calculation unit that calculates the data representing the environmental load on the basis of the print setting input by the print setting input unit and the environmental load calculation basis information stored in the environmental load calculation basis information storage unit;

a start instruction image display unit that displays a start instruction image for instructing to start printing within a predetermined display region;

a position instruction unit that instructs the position on the display region;

a determination unit that allows printing if it is determined that an instruction of the position instruction unit with respect to a display position of the start instruction image has been made, wherein the start instruction image display unit changes the position of the start instruction image on the basis of the data representing the environmental load calculated by the environmental load calculation unit;

a print operation input unit through which a print operation for instructing to start printing is input;

a compression force adjustment unit that adjusts a compression force at the time of input to the print operation input unit; and a compression force control unit that controls the compression force adjustment unit on the basis of the data representing the environmental load calculated by the environmental load calculation unit.

23. The printing support system for reducing the environmental load according to claim 22, wherein the start instruction image display unit displays the start instruction image at a first position when it is determined that the data representing the environmental load is smaller than a predetermined value, and the start instruction image display unit displays the start instruction image at a second position different from the first position when it is determined that the data representing the environmental load is equal to or larger than the predetermined value.

24. A printing support method for reducing an environmental load that changes an input load of a print operation depending on data representing the environmental load, comprising:

inputting a print setting;

calculating the environmental load by calculating the data representing the environmental load on the basis of the print setting made in the inputting of the print setting and environmental load calculation basis information stored in an environmental load calculation basis information storage unit used to calculate the data representing the environmental load;

displaying a start instruction image for instructing to start printing within a predetermined display region; and determining that printing is allowed when it is determined that an instruction of a position instruction unit with respect to a display position of the start instruction image has been made, wherein, in the displaying of the start instruction image, the size of the start instruction image is changed on the basis of the data representing the environmental load obtained in the calculating of the environmental load, inputting a print operation for instructing to start printing;

adjusting a compression force at the time of the inputting of the print operation; and controlling the adjusting on the basis of the data representing the environmental load.

25. A printing support method for reducing an environmental load that changes an input load of a paint operation depending on data representing the environmental load, comprising:

inputting a print setting;

calculating the environmental load by calculating the data representing the environmental load on the basis of the print setting made in the inputting of the print setting and environmental load calculation basis information stored in an environmental load calculation basis information storage unit used to calculate the data representing the environmental load;

displaying a start instruction image for instructing to start printing within a predetermined display region; and determining that printing is allowed when it is determined that an instruction of a position instruction unit with respect to a display position of the start instruction image has been made, wherein, in the displaying of the start instruction image, the concentration of a color of the start instruction image is changed on the basis of the data representing the environmental load obtained in the calculating of the environmental load, inputting a print operation for instructing to start printing;

adjusting a compression force at the time of the inputting of the print operation; and controlling the adjusting on the basis of the data representing the environmental load.

26. A printing support method for reducing an environmental load that changes an input load of a print operation depending on data representing the environmental load, comprising:

inputting a print setting;

calculating the environmental load by calculating the data representing the environmental load on the basis of the print setting made in the inputting of the print setting and environmental load calculation basis information stored in an environmental load calculation basis information storage unit used to calculate the data representing the environmental load;

displaying a start instruction image for instructing to start printing within a predetermined display region; and determining that printing is allowed when it is determined that an instruction of a position instruction unit with respect to a display position of the start instruction image has been made, wherein, in the displaying of the start instruction image, the position of the start instruction image is changed on the basis of the data representing the environmental load obtained in the calculating of the environmental load, inputting a print operation for instructing to start printing;

adjusting a compression force at the time of the inputting of the print operation; and controlling the adjusting on the basis of the data representing the environmental load.

* * * * *